United States Patent [19]
Shibayama

[11] Patent Number: 5,585,970
[45] Date of Patent: Dec. 17, 1996

[54] ZOOM LENS WITH HIGH ZOOM RATIO

[75] Inventor: Atsushi Shibayama, Kawasaki, Japan

[73] Assignee: Nikon Corporation, Tokyo, Japan

[21] Appl. No.: 418,768

[22] Filed: Apr. 7, 1995

[30] Foreign Application Priority Data

Apr. 19, 1994 [JP] Japan .................................. 6-080500
Apr. 19, 1994 [JP] Japan .................................. 6-080503

[51] Int. Cl.$^6$ ............................. G02B 15/14; G02B 3/02
[52] U.S. Cl. ................................... 359/686; 359/715
[58] Field of Search ................................ 359/686, 715

[56] References Cited

U.S. PATENT DOCUMENTS

| | | | |
|---|---|---|---|
| 4,759,617 | 7/1988 | Tokumaru et al. | 359/686 |
| 5,276,553 | 1/1994 | Tatsuno | 359/686 |

FOREIGN PATENT DOCUMENTS

| | | |
|---|---|---|
| 62-63909 | 3/1987 | Japan . |
| 5-173071 | 7/1993 | Japan . |
| 5-313065 | 11/1993 | Japan . |

*Primary Examiner*—Nabil Z. Hindi
*Assistant Examiner*—Evelyn A. Lester
*Attorney, Agent, or Firm*—Shapiro and Shapiro

[57] ABSTRACT

A zoom lens with a high zoom ratio has, in the following order from the object side, a first lens unit having a negative refractive power, a second lens unit having a positive refractive power, a third lens unit having a negative refractive power, and a fourth lens unit having a positive refractive power, and attains zooming from the wide-angle end to the telephoto end by reducing the air gap between the first and second lens units, extending the air gap between the second and third lens units, and reducing the air gap between the third and fourth lens units.

28 Claims, 33 Drawing Sheets

SPHERICAL ABERRATION
H=5.9

ASTIGMATISM
Y=21.6

DISTORTION
Y=21.6

CHROMATIC ABERRATION
OF MAGNIFICATION
Y=21.6

SPHERICAL ABERRATION
H=10.2

ASTIGMATISM
Y=21.6

DISTORTION
Y=21.6

CHROMATIC ABERRATION
OF MAGNIFICATION
Y=21.6

SPHERICAL ABERRATION
H=3.4

ASTIGMATISM
Y=21.6

DISTORTION
Y=21.6

CHROMATIC ABERRATION
OF MAGNIFICATION
Y=21.6

SPHERICAL ABERRATION
H=6.0

ASTIGMATISM
Y=21.6

DISTORTION
Y=21.6

(%)

CHROMATIC ABERRATION
OF MAGNIFICATION
Y=21.6

SPHERICAL ABERRATION
H=8.9

ASTIGMATISM
Y=21.6

DISTORTION
Y=21.6

CHROMATIC ABERRATION
OF MAGNIFICATION
Y=21.6

SPHERICAL ABERRATION
H=3.4

ASTIGMATISM
Y=21.6

DISTORTION
Y=21.6

CHROMATIC ABERRATION
OF MAGNIFICATION
Y=21.6

SPHERICAL ABERRATION
H=6.0

ASTIGMATISM
Y=21.6

DISTORTION
Y=21.6

CHROMATIC ABERRATION
OF MAGNIFICATION
Y=21.6

SPHERICAL ABERRATION
H=8.8

ASTIGMATISM
Y=21.6

DISTORTION
Y=21.6

(%)

CHROMATIC ABERRATION
OF MAGNIFICATION
Y=21.6

SPHERICAL ABERRATION
H=3.4

ASTIGMATISM
Y=21.6

DISTORTION
Y=21.6

CHROMATIC ABERRATION
OF MAGNIFICATION
Y=21.6

SPHERICAL ABERRATION
H=6.0

ASTIGMATISM
Y=21.6

DISTORTION
Y=21.6

CHROMATIC ABERRATION
OF MAGNIFICATION
Y=21.6

SPHERICAL ABERRATION
H=8.9

ASTIGMATISM
Y=21.6

DISTORTION
Y=21.6

(%)

CHROMATIC ABERRATION
OF MAGNIFICATION
Y=21.6

SPHERICAL ABERRATION
H=3.4

ASTIGMATISM
Y=21.6

DISTORTION
Y=21.6

CHROMATIC ABERRATION
OF MAGNIFICATION
Y=21.6

SPHERICAL ABERRATION
H=5.9

ASTIGMATISM
Y=21.6

DISTORTION
Y=21.6

CHROMATIC ABERRATION
OF MAGNIFICATION
Y=21.6

SPHERICAL ABERRATION
H=8.5

ASTIGMATISM
Y=21.6

DISTORTION
Y=21.6

CHROMATIC ABERRATION
OF MAGNIFICATION
Y=21.6

SPHERICAL ABERRATION
H=3.4

ASTIGMATISM
Y=21.6

DISTORTION
Y=21.6

CHROMATIC ABERRATION
OF MAGNIFICATION
Y=21.6

SPHERICAL ABERRATION
H=6.0

ASTIGMATISM
Y=21.6

DISTORTION
Y=21.6

CHROMATIC ABERRATION
OF MAGNIFICATION
Y=21.6

SPHERICAL ABERRATION
H=8.9

ASTIGMATISM
Y=21.6

DISTORTION
Y=21.6

CHROMATIC ABERRATION
OF MAGNIFICATION
Y=21.6

SPHERICAL ABERRATION
H=3.2

ASTIGMATISM
Y=21.6

DISTORTION
Y=21.6

CHROMATIC ABERRATION
OF MAGNIFICATION
Y=21.6

SPHERICAL ABERRATION
H=6.1

ASTIGMATISM
Y=21.6

DISTORTION
Y=21.6

CHROMATIC ABERRATION
OF MAGNIFICATION
Y=21.6

SPHERICAL ABERRATION
H=10.0

ASTIGMATISM
Y=21.6

DISTORTION
Y=21.6

CHROMATIC ABERRATION
OF MAGNIFICATION
Y=21.6

SPHERICAL ABERRATION
H=3.4

ASTIGMATISM
Y=21.6

DISTORTION
Y=21.6

CHROMATIC ABERRATION
OF MAGNIFICATION
Y=21.6

SPHERICAL ABERRATION
H=5.9

ASTIGMATISM
Y=21.6

DISTORTION
Y=21.6

CHROMATIC ABERRATION
OF MAGNIFICATION
Y=21.6

SPHERICAL ABERRATION
H=10.2

ASTIGMATISM
Y=21.6

DISTORTION
Y=21.6

(%)

CHROMATIC ABERRATION OF MAGNIFICATION
Y=21.6

SPHERICAL ABERRATION
H=3.5

ASTIGMATISM
Y=21.6

DISTORTION
Y=21.6

CHROMATIC ABERRATION
OF MAGNIFICATION
Y=21.6

SPHERICAL ABERRATION
H=6.2

ASTIGMATISM
Y=21.6

DISTORTION
Y=21.6

CHROMATIC ABERRATION
OF MAGNIFICATION
Y=21.6

SPHERICAL ABERRATION
H=10.3

ASTIGMATISM
Y=21.6

DISTORTION
Y=21.6

CHROMATIC ABERRATION
OF MAGNIFICATION
Y=21.6

ZOOM LENS WITH HIGH ZOOM RATIO

BACKGROUND OF THE INVENTION

1. Field of the Invention

The present invention relates to a zoom lens with a high zoom ratio, which is suitable for a single-lens reflex camera, compact camera, video camera, and the like and, more particularly, to a zoom lens with a high zoom ratio, which includes a wide field angle of about 80° or more, and has a zoom ratio of about ×4 or more.

2. Related Background Art

Conventionally, many zoom lenses each of which includes a wide field angle of about 70° and has a zoom ratio of about ×3 have been proposed. Each of such zoom lenses normally has a negative first lens unit, a positive second lens unit, a negative third lens unit, and a positive fourth lens unit. Since the negative lens unit is arranged at a position closest to the object side, a wide field angle is realized. In addition, the four-unit arrangement assures a high degree of freedom in aberration correction and increases the zoom ratio. As an example of such zoom lenses, Japanese Patent Application Laid-Open No. 62-63909 is known.

The field angle, at the wide-angle end, of the zoom lens proposed by Japanese Patent Application Laid-Open No. 62-63909 is about 70°, and the zoom ratio is about ×3. However, in recent years, a zoom lens with a wider field angle and higher zoom ratio is required as a standard zoom lens for a single-lens reflex camera, and the zoom lens proposed by Japanese Patent Application Laid-Open No. 62-63909 cannot satisfy this requirement.

In order to satisfy the requirement associated with a wider field angle, Japanese Patent Application Laid-Open No. 5-173071 proposes a zoom lens including a wide field angle of 80° or more. However, the zoom ratio of this zoom lens is as small as ×2 or less, and this lens cannot satisfy the requirement associated with a higher zoom ratio.

On the other hand, in order to satisfy the requirement associated with a higher zoom ratio, Japanese Patent Application Laid-Open No. 5-313065 proposes a zoom lens having a zoom ratio exceeding ×4. However, this zoom lens has a field angle, at the wide-angle end, of about 70°, and cannot sufficiently satisfy the requirement associated with a wider field angle.

SUMMARY OF THE INVENTION

It is an object of the present invention to provide a compact zoom lens which has a field angle, at the wide-angle end, of 80° or more and a zoom ratio of ×4 or more, and also has good imaging performance.

In order to achieve the above object, according to the first aspect of the present invention, a zoom lens of the present invention comprises, in the following order from the object side, a first lens unit having a negative refractive power, a second lens unit having a positive refractive power, a third lens unit having a negative refractive power, and a fourth lens unit having a positive refractive power, and performs a zooming operation from the wide-angle end to the telephoto end by reducing an air gap between the first and second lens units, extending an air gap between the second and third lens units, and reducing an air gap between the third and fourth lens units. The zoom lens satisfies the following conditions:

$$-0.45 < f1/fT < -0.15$$

$$0.2 < f4/fT < 0.35$$

$$-4.0 < B2T < -1.6$$

where fT is the focal length of the zoom lens at the telephoto end, f1 is the focal length of the first lens unit, f4 is the focal length of the fourth lens unit, and B2T is the imaging magnification of the second lens unit at the telephoto end.

In the zoom lens having the negative first lens unit, the positive second lens unit, the negative third lens unit, and the positive fourth lens unit, at the wide-angle end, a synthesized principal point from the second lens unit to the fourth lens unit is located relatively near the image surface by decreasing the interval between the positive second lens unit and the negative third lens unit, and by increasing the interval between the negative third lens unit and the positive fourth lens unit, and at the telephoto end, the synthesized principal point from the second lens unit to the fourth lens unit is located relatively near the object by increasing the interval between the positive second lens unit and the negative third lens unit, and by decreasing the interval between the negative third lens unit and the positive fourth lens unit. With this arrangement, a large change in distance between the principal point of the negative first lens unit and the synthesized principal point from the second lens unit to the fourth lens unit can be assured, thus increasing the zoom ratio.

Furthermore, by changing the intervals between the second and third lens units and between the third and fourth lens units, the curvature of field can be satisfactorily corrected from the wide-angle end to the telephoto end. Even when the zoom ratio is increased, good imaging performance can be obtained.

In the above arrangement, the present invention provides conditional formulas (1) to (3) below so as to simultaneously achieve a high zoom ratio and a wide field angle of the zoom lens:

$$-0.45 < f1/fT < -0.15 \quad (1)$$

$$0.2 < f4/fT < 0.35 \quad (2)$$

$$-4.0 < B2T < -1.6 \quad (3)$$

where
- fT: the focal length, at the telephoto end, of the zoom lens
- f1: the focal length of the first lens unit
- f4: the focal length of the fourth lens unit
- B2T: the imaging magnification of the second lens unit at the telephoto end Conditional formula (1) defines an optimal range of the focal length of the first lens unit. When f1/fT is smaller than the lower limit of conditional formula (1), the negative refractive power of the first lens unit becomes small, and it is difficult to obtain a high zoom ratio. On the contrary, when f1/fT exceeds the upper limit of conditional formula (1), the negative refractive power of the first lens unit becomes large, and the negative distortion at the wide-angle end generated in the first lens unit becomes excessive. As a result, it becomes difficult to correct distortion especially when a wide field angle is to be realized.

Conditional formula (2) defines an optimal range of the focal length of the fourth lens unit. When f4/fT exceeds the upper limit of conditional formula (2), the positive refractive power of the fourth lens unit becomes small, and the back focus at the wide-angle end becomes small. As a result, the fourth lens unit interferes with a mirror in a zoom lens for a single-lens reflex camera. On the other hand, in a compact camera in which the limitations as to the back focus are not strict, the lens diameter of the fourth lens unit increases, thus disturbing a compact structure. On the contrary, when f4/fT is smaller than the lower limit of conditional formula (2), the positive refractive power of the fourth lens unit becomes excessive, and the arrangement of the fourth lens unit becomes complicated to achieve aberration correction. For this reason, the total length of the zoom lens increases, thus disturbing a compact structure.

Conditional formula (3) defines an optimal range of the imaging magnification of the second lens unit at the telephoto end. When B2T is smaller than the lower limit of conditional formula (3), the absolute value of the imaging magnification of the second lens unit becomes large, and various aberrations generated in the first lens unit are magnified. As a result, since the aberrations generated in the first lens group must be suppressed to be very small, the arrangement of the first lens unit is complicated and becomes large. For this reason, such small B2T is not preferable. On the contrary, when B2T exceeds the upper limit of conditional formula (3), the total length (the distance from a lens surface closest to the object side to a lens surface closest to the image side) of the zoom lens at the wide-angle end and the effective diameter of the first lens unit increase, thus disturbing a compact structure.

The present invention also provides conditional formulas (4) to (6) below as more preferable conditions:

$$-0.30 < f3/fT < -0.15 \quad (4)$$

$$2.8 < B2T/B2W < 6.0 \quad (5)$$

$$-3.0 < \Delta e2/\Delta e3 < -0.9 \quad (6)$$

where f3: the focal length of the third lens unit

B2W: the imaging magnification of the second lens unit at the wide-angle end

Δe2: the difference between intervals between the second and third lens units at the telephoto end and the wide-angle end of the zoom lens Δe3: the difference between intervals between the third and fourth lens units at the telephoto end and the wide-angle end of the zoom lens Conditional formula (4) defines a proper range of the focal length of the third lens unit. When f3/fT is smaller than the lower limit of conditional formula (4), the negative refractive power of the third lens unit becomes small, and a change in synthesized principal point position from the second lens unit to the fourth lens unit upon zooming becomes small. As a result, it is difficult to achieve a high zoom ratio. On the contrary, when f3/fT exceeds the upper limit of conditional formula (4), the negative refractive power of the third lens unit becomes large, and the total length of the zoom lens increases, thus disturbing a compact structure.

Conditional formula (5) defines an appropriate range of the ratio between the imaging magnifications of the second lens unit at the telephoto end and the wide-angle end. When the ratio exceeds the upper limit of conditional formula (5), a change in imaging magnification of the second lens unit becomes large, and changes in various aberrations upon zooming, in particular, changes in spherical aberration and coma, become large. As a result, it is difficult to correct these aberrations. On the contrary, when the ratio is smaller than the lower limit of conditional formula (5), a change in imaging magnification of the second lens unit becomes small, and it becomes difficult to achieve a high zoom ratio.

Conditional formula (6) defines an appropriate range of the ratio between a change in interval between the second and third lens units upon zooming and a change in interval between the third and fourth lens units upon zooming. When the ratio is smaller than the lower limit of conditional formula (6), the change in interval between the third and fourth lens units becomes relatively small, and it becomes difficult to correct a variation in curvature of field upon zooming. Therefore, such a small ratio is not preferable. When the ratio exceeds the upper limit of conditional formula (6), the change in interval between the second and third lens units becomes relatively small, and the effective diameter of the third lens unit at the telephoto end and the aperture size increase. For this reason, such a large ratio is not preferable, either. In order to decrease the aperture size, the upper limit value of conditional formula (6) is more preferably set to be −1.2.

Furthermore, in order to achieve both a compact zoom lens and satisfactory aberration correction, an aspherical surface is preferably arranged in the first lens unit. In this case, the aspherical surface preferably has an aspherical surface shape, so that the negative refractive power gradually decreases toward the peripheral portion.

Furthermore, in order to correct spherical aberration and distortion, which tend to be generated in the fourth lens unit, with good balance, an aspherical surface is preferably arranged in the fourth lens unit. In this case, the aspherical surface is preferably arranged on a boundary surface with the air, and preferably has an aspherical surface shape, so that the positive refractive power gradually decreases toward the peripheral portion.

According to the second aspect of the present invention, a zoom lens comprises, in the following order from the object side, a first lens unit having a negative refractive power, a second lens unit having a positive refractive power, a third lens unit having a negative refractive power, and a fourth lens unit having a positive refractive power, and performs a zooming operation from the wide-angle end to the telephoto end by reducing an air gap between the first and second lens units, extending an air gap between the second and third lens units, and reducing an air gap between the third and fourth lens units. The zoom lens satisfies the following conditions:

$$-0.45 < f1/fT < -0.20$$

$$-3.0 < f3/fW < -1.2$$

$$2.0 < f4/fW < 6.0$$

where fW is the focal length of the zoom lens at the wide-angle end, fT is the focal length of the zoom lens at the telephoto end, f1 is the focal length of the first lens unit, f3 is the focal length of the third lens unit, and f4 is the focal length of the fourth lens unit.

In the zoom lens having the negative first lens unit, the positive second lens unit, the negative third lens unit, and the positive fourth lens unit as in the present invention, at the wide-angle end, a synthesized principal point from the second lens unit to the fourth lens unit is located relatively near the image surface by decreasing the interval between the positive second lens unit and the negative third lens unit, and by increasing the interval between the negative third lens unit and the positive fourth lens unit, and at the telephoto end, the synthesized principal point from the second lens unit to the fourth lens unit is located relatively near the object by increasing the interval between the positive second lens unit and the negative third lens unit, and by decreasing the interval between the negative third lens unit and the positive fourth lens unit. With this arrangement, a large change in distance between the principal point of the negative first lens unit and the synthesized principal point from the second lens unit to the fourth lens unit can be assured, thus increasing the zoom ratio. Furthermore, by changing the intervals between the second and third lens units and between the third and fourth lens units, the curvature of field can be satisfactorily corrected from the wide-angle end to the telephoto end. Even when the zoom ratio is increased, good imaging performance can be obtained.

In the above arrangement, the present invention provides conditional formulas (7) to (9) below so as to simultaneously achieve a high zoom ratio and a wide field angle of the zoom lens:

$$-0.45 < f1/fT < -0.20 \quad (7)$$

$$-3.0 < f3/fW < -1.2 \quad (8)$$

$$2.0 < f4/fW < 6.0 \quad (9)$$

where fW: the focal length, at the wide-angle end, of the zoom lens fT: the focal length, at the telephoto end, of the zoom lens f1: the focal length of the first lens unit f3: the focal length of the third lens unit f4: the focal length of the fourth lens unit Conditional formula (7) defines an optimal range of the focal length of the first lens unit. When f1/fT is smaller than the lower limit of conditional formula (7), the negative refractive power of the first lens unit becomes small, and it is difficult to obtain a high zoom ratio. On the contrary, when f1/fT exceeds the upper limit of conditional formula (7), the negative refractive power of the first lens unit becomes large, and the negative distortion at the wide-angle end generated in the first lens unit becomes excessive. As a result, it becomes difficult to correct distortion especially when a wide field angle is to be achieved.

Conditional formula (8) defines an optimal range of the focal length of the third lens unit. When f3/fW is smaller than the lower limit of conditional formula (8), the negative refractive power of the third lens unit becomes small, and a change in synthesized principal point position from the second lens unit to the fourth lens unit upon zooming becomes small. As a result, it becomes difficult to achieve a high zoom ratio. On the contrary, when f3/fW exceeds the upper limit of conditional formula (8), the negative refractive power of the third lens unit becomes large, and the total length (the distance from a lens surface closest to the object side to an image surface) of the zoom lens increases, thus disturbing a compact structure.

Conditional formula (9) defines an optimal range of the focal length of the fourth lens unit. When f4/fW exceeds the upper limit of conditional formula (9), the positive refractive power of the fourth lens unit becomes small, and the back focus at the wide-angle end decreases. As a result, the fourth lens unit interferes with a mirror in a zoom lens for a single-lens reflex camera. On the other hand, in a compact camera in which the limitations as to the back focus are not strict, the lens diameter of the fourth lens unit increases, thus disturbing a compact structure. On the contrary, when f4/fW is smaller than the lower limit of conditional formula (9), the positive refractive power of the fourth lens unit becomes excessive, and the arrangement of the fourth lens unit must be complicated to achieve aberration correction. For this reason, the total length of the zoom lens increases, thus disturbing a compact structure.

The present invention provides conditional formulas (10) to (14) below as more preferable conditions:

$$0.7 < f3/f1 < 2.0 \quad (10)$$

$$2.8 < B2T/B2W < 5.0 \quad (11)$$

$$0.5 < f1\text{-}3W/fW < 5 \quad (12)$$

$$1 < f1\text{-}3T/f1 \quad (13)$$

$$0.03 < T4/fT < 0.10 \quad (14)$$

where

B2W: the imaging magnification of the second lens unit at the wide-angle end

B2T: the imaging magnification of the second lens unit at the telephoto end f1-3W: the synthesized focal length of the first, second, and third lens units at the wide-angle end f1-3T: the synthesized focal length of the first, second, and third lens units at the telephoto end T4: the on-axis thickness from a lens surface closest to the object side to a lens surface closest to the image side in the fourth lens unit Conditional formula (10) defines an appropriate range of the ratio between the focal lengths of the third and first lens units. When the ratio exceeds the upper limit of conditional formula (10), the refractive power of the first lens unit becomes relatively large, and it becomes difficult to correct various aberrations such as distortion at the wide-angle end. On the contrary, when the ratio is smaller than the lower limit of conditional formula (10), the refractive power of the first lens unit becomes relatively small, and it becomes difficult to achieve a high zoom ratio.

Conditional formula (11) defines an appropriate range of the ratio between the imaging magnifications of the second lens unit at the telephoto end and the wide-angle end. When the ratio exceeds the upper limit of conditional formula (11), a change in imaging magnification of the second lens unit becomes large, and changes in various aberrations, especially, changes in spherical aberration and coma, become large. As a result, it becomes difficult to correct such aberrations. On the contrary, when the ratio is smaller than the lower limit of conditional formula (11), a change in imaging magnification of the second lens unit becomes small, and it becomes difficult to achieve a high zoom ratio.

In the present invention, on-axis light rays which pass between the third and fourth lens units are weakly convergent rays at the wide-angle end, and are weakly divergent rays at the telephoto end. This arrangement is preferable to decrease the total length of the zoom lens and to assure a sufficient back focus at the wide-angle end at the same time. Conditional formulas (12) and (13) are preferred conditions for such an arrangement.

Conditional formula (12) defines an appropriate range of the synthesized focal length from the first lens unit to the third lens unit at the wide-angle end. When f1-3W/fW is smaller than the lower limit of conditional formula (12), on-axis light rays which pass between the third and fourth lens units become strongly convergent rays at the wide-angle end, and it becomes difficult to assure a sufficient back focus. On the contrary, when f1-3W/fW exceeds the upper limit of conditional formula (12), on-axis light rays which pass between the third and fourth lens units become substantially collimated rays at the wide-angle end. As a result, the total length of the zoom lens increases, thus disturbing a compact structure.

Conditional formula (13) defines an appropriate range of the synthesized focal length from the first lens unit to the third lens unit at the telephoto end. When f1-3T/f1 is smaller than the lower limit of conditional formula (13), on-axis light rays which pass between the third and fourth lens units become strongly divergent rays at the telephoto end, and the total length of the zoom lens increases, thus disturbing a compact structure.

Conditional formula (14) defines an appropriate range of the thickness of the fourth lens unit. When T4/fT is smaller than the lower limit of conditional formula (14), a sufficient central thickness of each of lenses constituting the fourth lens unit, and a sufficient thickness (edge thickness) of the outer peripheral portion of the lens cannot be assured. On the contrary, when T4/fT exceeds the upper limit of the conditional formula (14), the total thickness of the fourth lens unit increases, and such large T4/fT is not preferable since it results in an increase in size of the zoom lens and an insufficient back focus. In order to satisfactorily correct spherical aberration and chromatic aberration under conditional formula (14), the fourth lens unit is preferably constituted by a single negative lens and a single positive lens. In this case, in order to facilitate assembling/adjustment, the negative and positive lenses are preferably cemented to each other. Furthermore, the fourth lens unit preferably satisfies conditional formulas (15) and (16) below:

$$nN-nP>0 \quad (15)$$

$$vP-vN>10 \quad (16)$$

where nN: the refractive index of the negative lens constituting the fourth lens unit nP: the refractive index of the positive lens constituting the fourth lens unit vN: the Abbe's number of the negative lens constituting the fourth lens unit vP: the Abbe's number of the positive lens constituting the fourth lens unit Conditional formula (15) defines an appropriate range of the difference between the refractive indices of the negative and positive lenses constituting the fourth lens unit. When the difference is smaller than the lower limit of conditional formula (15), the spherical aberration generated in the fourth lens unit increases. For this reason, such a small difference is not preferable.

Conditional formula (16) defines an appropriate range of the difference between the Abbe's numbers of the negative and positive lenses constituting the fourth lens unit. When the difference is smaller than the lower limit of conditional formula (16), the chromatic aberration generated in the fourth lens unit increases. For this reason, such a small difference is not preferable.

Furthermore, in order to correct spherical aberration and distortion, which tend to be generated in the fourth lens unit, with a good balance, an aspherical surface is preferably arranged in the fourth lens unit. In this case, the aspherical surface is preferably arranged at a boundary surface with the air, and preferably has an aspherical surface shape, so that the positive refractive power gradually decreases toward the peripheral portion.

Note that an aspherical surface amount A(h) is defined by the following formula:

$$A(h)=X(h)-(h^2/r)/[1+(1-h^2/r^2)^{1/2}]$$

where h is the height from the optical axis, X(h) is the distance from the tangent plane of the vertex of the aspherical surface to the aspherical surface at the height h along the optical axis direction, and r is the paraxial radius of curvature of the aspherical surface.

In this case, the aspherical surface shape in the fourth lens unit preferably satisfies conditional formulas (17) and (18) below:

$$(nF-nR)\cdot A(Y/3)>0 \quad (17)$$

$$A(Y/3)/A(Y/4)>2 \quad (18)$$

where Y is the maximum image height, nF is the refractive index, on the object side, of the aspherical surface, and nR is the refractive index, on the image side, of the aspherical surface.

When the aspherical surface shape falls outside the ranges of conditional formulas (17) and (18), it becomes difficult to correct spherical aberration and distortion with a good balance.

Furthermore, in order to achieve both a compact zoom lens and satisfactory aberration correction, an aspherical surface is preferably arranged in the first lens unit. In this case, the aspherical surface preferably has an aspherical surface shape, so that the negative refractive power gradually decreases toward the peripheral portion.

The above and other objects, features and advantages of the present invention are explained hereinafter and may be better understood by reference to the drawings and the descriptive matter which follows.

DETAILED DESCRIPTION OF THE PREFERRED EMBODIMENTS

FIGS. 1 to 9 respectively show the lens arrangements according to the first to ninth embodiments of the present invention.

In data tables of the respective embodiments, f is the focal length, F is the f-number, and $2\omega$ is the field angle. Furthermore, numerals in the leftmost column represent the order of lens surfaces from the object side, r is the radius of curvature of each lens surface, d is the lens surface interval, and n and $\nu$ are respectively the refractive index and Abbe's number for the d-line ($\lambda=587.6$ nm). In addition, a surface with a mark * attached to the corresponding numeral in the leftmost column is an aspherical surface. The aspherical surface shape is expressed by:

$$X(h)=(h^2/r)/[1+(1-kh^2/r^2)^{1/2}]+C4h^4+C6h^6+C8h^8+C10h^{10}$$

where h is the height from the optical axis in a direction perpendicular to the optical axis, X(h) is the distance from the tangent plane of the vertex of the aspherical surface to the aspherical surface at the height h along the optical axis direction, r is the paraxial radius of curvature, k is a coefficient of cone, and Cn is an n-th order aspherical surface coefficient. Note that the maximum image height is Y=21.6 in each embodiment.

[First Embodiment]

Figure 1:
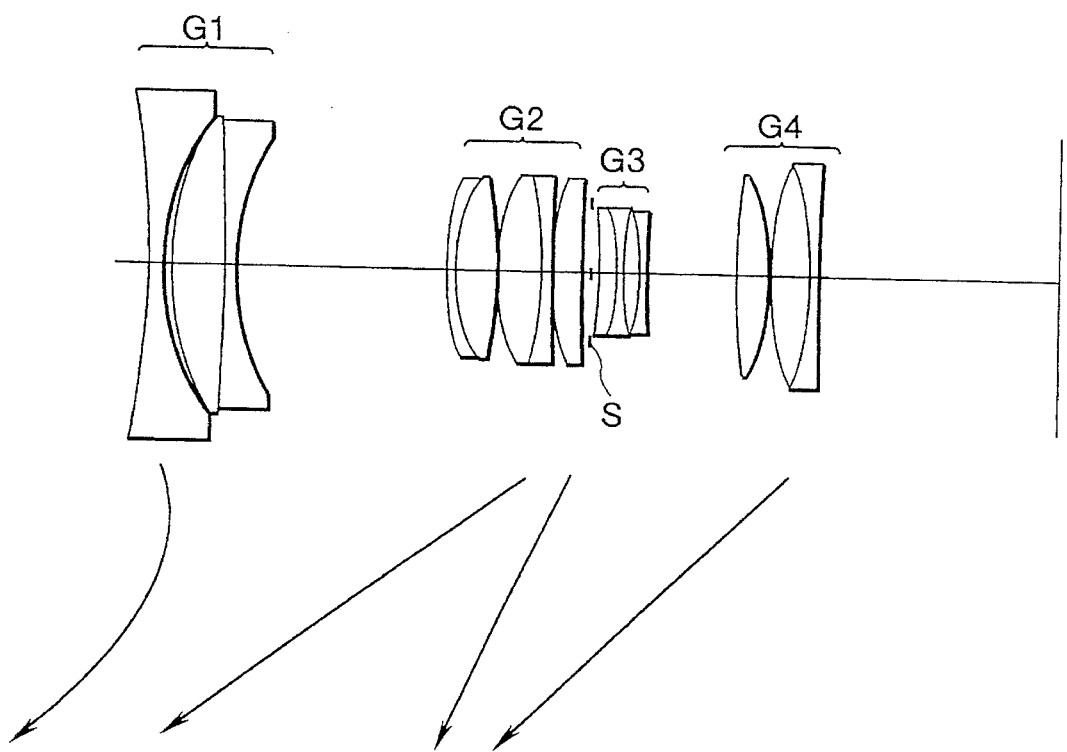
FIG. 1 is a view showing the lens arrangement according to a first embodiment of the present invention.

In the first embodiment, as shown in FIG. 1, a negative first lens unit G1 includes, in the following order from the object side, a biconcave negative lens having an aspherical surface on its image side, and a cemented lens of a biconvex positive lens and a biconcave negative lens. A positive second lens unit G2 includes, in the following order from the object side, a cemented lens of a negative meniscus lens having a convex surface facing the object side and a biconvex positive lens, a cemented lens of a biconvex positive lens and a biconcave negative lens, and a biconvex positive lens. A negative third lens unit G3 includes, in the following order from the object side, a cemented lens of a positive meniscus lens having a concave surface facing the object side and a biconcave negative lens, and a negative meniscus lens having a concave surface facing the object side. A positive fourth lens unit G4 includes, in the following order from the object side, a biconvex positive lens having an aspherical surface on its image side, and a cemented lens of a biconvex positive lens and a biconcave negative lens. A stop S is located between the second and third lens units G2 and G3, and moves integrally with the third lens unit G3 upon zooming.

TABLE 1

Data Values of First Embodiment
$f = 24.70$ to $117.00$
$F = 3.63$ to $5.74$
$2\omega = 85.8$ to $20.6°$

|    | r         | d      | v     | n       |
|----|-----------|--------|-------|---------|
| 1  | −131.6912 | 2.0000 | 57.31 | 1.67000 |
| 2* | 28.0231   | 1.5000 |       |         |
| 3  | 41.1438   | 7.9000 | 25.36 | 1.80518 |
| 4  | −760.3533 | 2.0000 | 54.66 | 1.72916 |
| 5  | 35.4254   | D5     |       |         |
| 6  | 40.5115   | 1.3000 | 23.83 | 1.84666 |
| 7  | 25.2255   | 6.5000 | 70.24 | 1.48749 |
| 8  | −65.2860  | 0.1000 |       |         |
| 9  | 32.9756   | 7.0000 | 70.24 | 1.48749 |
| 10 | −45.4583  | 1.3000 | 33.27 | 1.80610 |
| 11 | 325.9241  | 0.1000 |       |         |
| 12 | 40.0380   | 5.0000 | 43.92 | 1.60562 |
| 13 | −511.1512 | D13    |       |         |
| 14 | (stop)    | 1.5000 |       |         |
| 15 | −117.9745 | 3.0000 | 23.83 | 1.84666 |
| 16 | −24.5271  | 1.1000 | 64.20 | 1.51680 |
| 17 | 37.5250   | 2.5000 |       |         |
| 18 | −26.7507  | 1.1000 | 43.04 | 1.84750 |
| 19 | −289.2668 | D19    |       |         |
| 20 | 90.2400   | 5.5000 | 58.44 | 1.65160 |
| 21*| −30.4940  | 0.1000 |       |         |
| 22 | 54.2164   | 6.0000 | 70.45 | 1.48749 |
| 23 | −51.8277  | 1.2000 | 25.46 | 1.80518 |
| 24 | 341.9931  | Bf     |       |         |

Second Surface Aspherical Surface Coefficients $k = 1.000$
$C4 = -0.1019 \times 10^{-4}$
$C6 = -0.7017 \times 10^{-8}$
$C8 = 0.7760 \times 10^{-11}$
$C10 = -0.1534 \times 10^{-13}$ 21st Surface Aspherical Surface Coefficients $k = 1.000$
$C4 = 0.8640 \times 10^{-5}$
$C6 = 0.2559 \times 10^{-7}$
$C8 = -0.5444 \times 10^{-10}$
$C10 = -0.6038 \times 10^{-13}$ Change in Interval Upon Zooming

| f   | 24.6998 | 48.9998 | 117.0017 |
|-----|---------|---------|----------|
| D5  | 32.4458 | 11.2472 | 1.0000   |
| D13 | 1.0000  | 9.7032  | 25.3695  |
| D19 | 13.8542 | 7.4402  | 1.0000   |
| Bf  | 38.1001 | 53.7971 | 96.0334  |

Condition Corresponding Values (1) $f1/fT = -0.275$
(2) $f4/fT = 0.286$
(3) $B2T = -2.535$
(4) $f3/fT = -0.232$
(5) $B2T/B2W = 3.658$
(6) $\Delta e2/\Delta e3 = -1.896$

[Second Embodiment]

Figure 2:
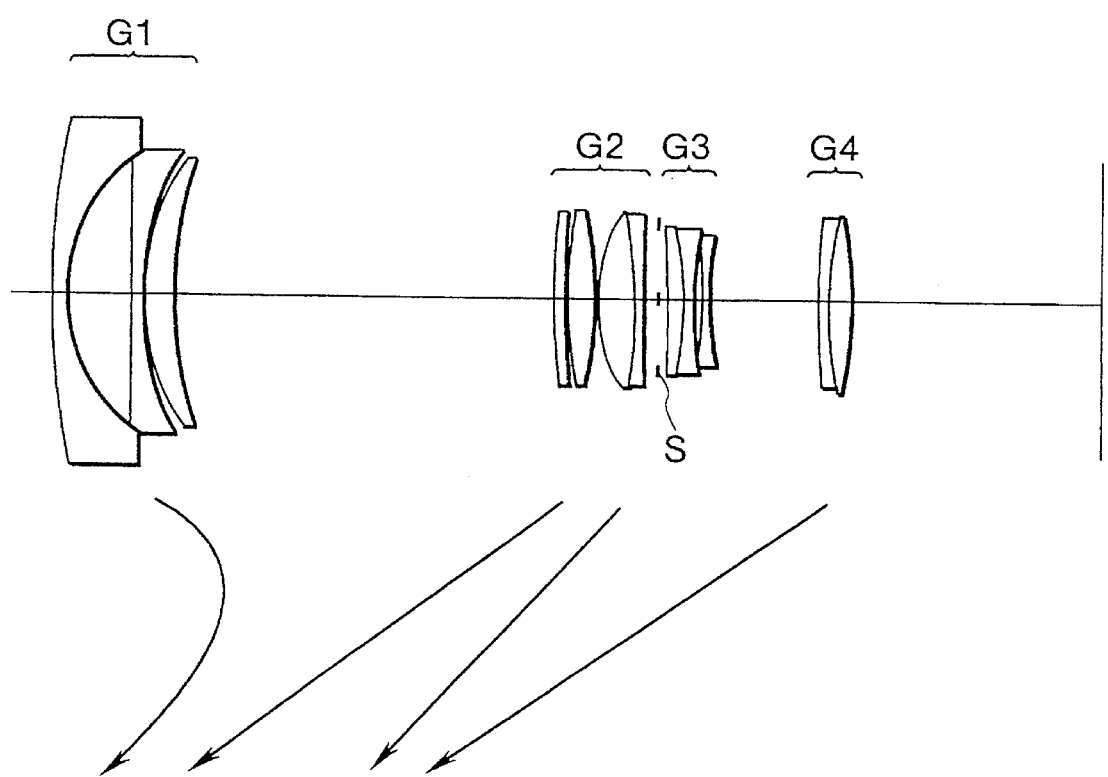
FIG. 2 is a view showing the lens arrangement according to a second embodiment of the present invention.

In the second embodiment, as shown in FIG. 2, a negative first lens unit G1 includes, in the following order from the object side, a negative meniscus lens having a convex surface facing the object side, a negative lens having an aspherical surface on its object side and a concave surface facing the image side, and a positive meniscus lens having a convex surface facing the object side. A positive second lens unit G2 includes, in the following order from the object side, a positive lens having a convex surface facing the object side, a biconvex positive lens, and a cemented lens of a biconvex positive lens and a biconcave negative lens. A negative third lens unit G3 includes, in the following order from the object side, a cemented lens of a positive meniscus lens having a concave surface facing the object side and a biconcave negative lens, and a biconcave negative lens. A positive fourth lens unit G4 includes, in the following order from the object side, a cemented lens of a negative lens having an aspherical surface on its object side and a biconvex positive lens. A stop S is located between the second and third lens units G2 and G3, and moves integrally with the third lens unit G3 upon zooming.

The data values and the condition corresponding values of the second embodiment will be summarized below.

TABLE 2

Data Values of Second Embodiment
$f = 24.73$ to $101.91$
$F = 3.61$ to $5.74$
$2\omega = 85.0$ to $23.9°$

|     | r           | d      | v     | n       |
|-----|-------------|--------|-------|---------|
| 1   | 134.0814    | 2.0000 | 46.53 | 1.80411 |
| 2   | 26.8030     | 9.6000 |       |         |
| 3*  | −408.8541   | 2.0000 | 70.45 | 1.48749 |
| 4   | 45.0510     | 0.4000 |       |         |
| 5   | 37.6455     | 4.4000 | 23.01 | 1.86074 |
| 6   | 70.4556     | D6     |       |         |
| 7   | 79.5627     | 2.4000 | 70.45 | 1.48749 |
| 8   | −15685.1950 | 0.1000 |       |         |
| 9   | 72.0590     | 3.9000 | 70.45 | 1.48749 |
| 10  | −72.0590    | 0.1000 |       |         |
| 11  | 26.6245     | 5.7000 | 70.45 | 1.48749 |
| 12  | −68.6946    | 1.1000 | 23.01 | 1.86074 |
| 13  | 648.6916    | D13    |       |         |
| 14  | (stop)      | 1.5000 |       |         |
| 15  | −133.8865   | 2.9000 | 23.01 | 1.86074 |
| 16  | −29.4116    | 1.0000 | 40.75 | 1.58144 |
| 17  | 70.3940     | 1.3000 |       |         |
| 18  | −100.1752   | 1.1000 | 39.61 | 1.80454 |
| 19  | 100.1754    | D19    |       |         |
| 20* | 137.3857    | 1.2000 | 23.01 | 1.86074 |
| 21  | 55.6664     | 4.0000 | 57.03 | 1.62280 |
| 22  | −55.6663    | Bf     |       |         |

Third Surface Aspherical Surface Coefficients $k = 1.000$
$C4 = 0.2523 \times 10^{-5}$
$C6 = 0.3865 \times 10^{-8}$
$C8 = -0.7973 \times 10^{-11}$
$C10 = 0.1805 \times 10^{-13}$ 20th Surface Aspherical Surface Coefficients $k = 1.000$
$C4 = -0.9256 \times 10^{-5}$
$C6 = -0.5305 \times 10^{-8}$
$C8 = -0.1131 \times 10^{-9}$
$C10 = 0.3622 \times 10^{-12}$ Change in Interval Upon Zooming

| f   | 24.7270 | 49.0112 | 101.9078 |
|-----|---------|---------|----------|
| D6  | 56.6702 | 18.6000 | 2.0000   |
| D13 | 2.5000  | 7.4960  | 8.6983   |
| D19 | 16.2000 | 7.9000  | 2.0000   |
| Bf  | 38.0015 | 57.3333 | 107.5903 |

Condition Corresponding Values (7) $f1/fT = -0.383$
(8) $f3/fW = -1.878$
(9) $f4/fW = 3.088$
(10) $f3/f1 = 1.189$
(11) $B2T/B2W = 3.398$
(12) $f1 - 3W/fW = 2.028$
(13) $f1 - 3T/f1 = 6.240$
(14) $T4/fT = 0.051$
(15) $nN - nP = 0.23794$
(16) $vP - vN = 34.02$
(17) $(nF - nR) \cdot A(Y/3) = 0.0226$
(18) $A(Y/3)/A(Y/4) = 3.254$

[Third Embodiment]

Figure 3:
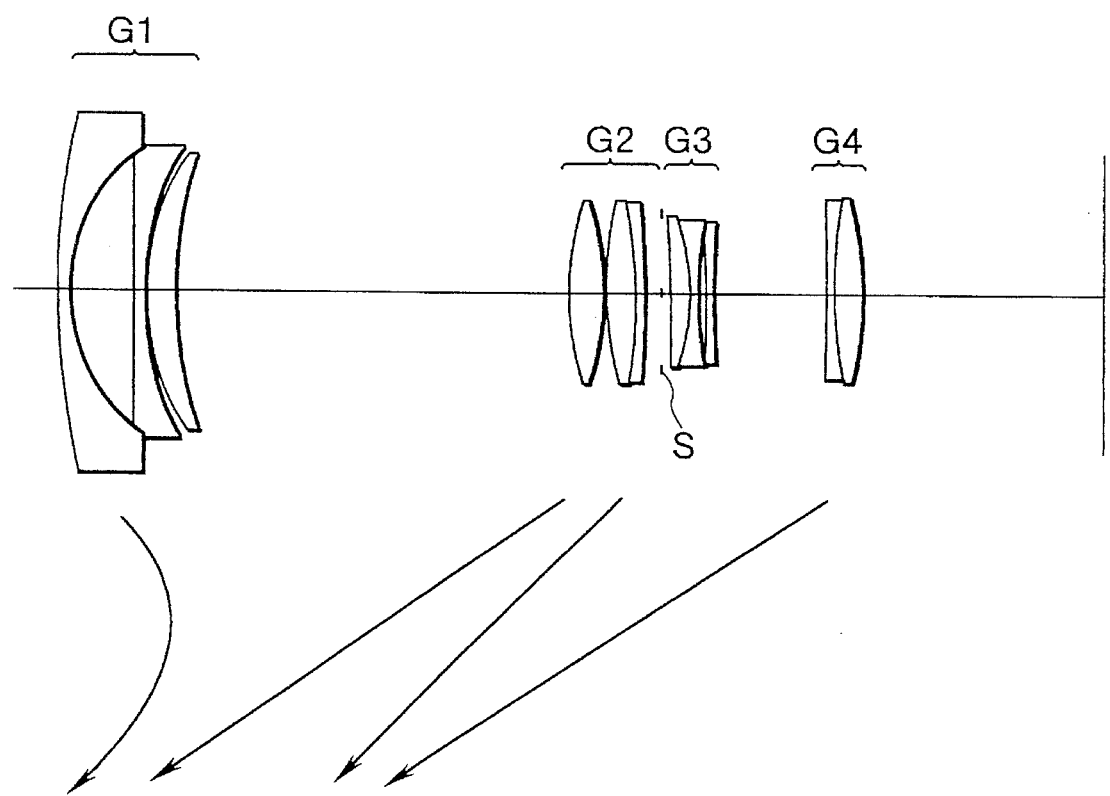
FIG. 3 is a view showing the lens arrangement according to a third embodiment of the present invention.

In the third embodiment, as shown in FIG. 3, a negative first lens unit G1 includes, in the following order from the object side, a negative meniscus lens having a convex surface facing the object side, a biconcave negative lens having an aspherical surface on its object side, and a positive meniscus lens having a convex surface facing the object side. A positive second lens unit G2 includes, in the following order from the object side, a biconvex positive lens having an aspherical surface on its object side, and a cemented lens of a biconvex positive lens and a negative meniscus lens having a concave surface facing the object side. A negative third lens unit G3 includes, in the following order from the object side, a cemented lens of a positive meniscus lens having a concave surface facing the object side and a biconcave negative lens, and a biconcave negative lens. A positive fourth lens unit G4 includes, in the following order from the object side, a cemented lens of a negative lens having an aspherical surface on its object side and a biconvex positive lens. A stop S is located between the second and third lens units G2 and G3, and moves integrally with the third lens unit G3 upon zooming.

The data values and the condition corresponding values of the third embodiment will be summarized below.

TABLE 3

Data Values of Third Embodiment
f = 24.70 to 101.90
F = 3.59 to 5.76
2ω = 85.1 to 23.9°

|  | r | d | ν | n |
|---|---|---|---|---|
| 1 | 104.2235 | 2.0000 | 46.53 | 1.80411 |
| 2 | 25.8606 | 10.1000 |  |  |
| 3* | −216.8961 | 2.0000 | 70.45 | 1.48749 |
| 4 | 48.2166 | 0.1500 |  |  |
| 5 | 37.4402 | 4.3000 | 23.01 | 1.86074 |
| 6 | 71.0656 | D6 |  |  |
| 7* | 35.1890 | 5.2000 | 70.45 | 1.48749 |
| 8 | −59.4696 | 0.1000 |  |  |
| 9 | 35.2772 | 5.5000 | 70.45 | 1.48749 |
| 10 | −42.1373 | 1.1000 | 23.01 | 1.86074 |
| 11 | −158.5682 | D11 |  |  |
| 12 | (stop) | 1.5000 |  |  |
| 13 | −147.4506 | 2.8000 | 23.01 | 1.86074 |
| 14 | −32.0581 | 1.0000 | 45.87 | 1.54814 |
| 15 | 49.9889 | 1.4000 |  |  |
| 16 | −104.5431 | 1.1000 | 46.53 | 1.80411 |
| 17 | 104.5446 | D17 |  |  |
| 18* | 844.4847 | 1.2000 | 23.01 | 1.86074 |
| 19 | 54.0396 | 4.3000 | 46.79 | 1.76684 |
| 20 | −54.0396 | Bf |  |  |

Third Surface Aspherical Surface Coefficients k = 1.000          C4 = 0.2119 × 10$^{-5}$
C6 = 0.3738 × 10$^{-8}$    C8 = −0.8468 × 10$^{-11}$
C10 = 0.1897 × 10$^{-13}$ Seventh Surface Aspherical Surface Coefficients k = 1.000          C4 = −0.3464 × 10$^{-5}$
C6 = −0.2286 × 10$^{-8}$   C8 = 0.6150 × 10$^{-11}$
C10 = −0.3735 × 10$^{-14}$ 18th Surface Aspherical Surface Coefficients k = 1.000          C4 = −0.7748 × 10$^{-5}$
C6 = −0.1290 × 10$^{-8}$   C8 = −0.1497 × 10$^{-9}$
C10 = 0.4915 × 10$^{-12}$ Change in Interval Upon Zooming

| f | 24.7000 | 49.0001 | 101.9008 |
|---|---|---|---|
| D6 | 58.6530 | 19.0236 | 2.0000 |
| D11 | 2.5000 | 7.1476 | 7.8945 |
| D17 | 17.0970 | 8.6575 | 2.0000 |
| Bf | 38.0934 | 57.4602 | 108.0300 |

Condition Corresponding Values (7) f1/fT = −0.391
(8) f3/fW = −1.781
(9) f4/fW = 3.002
(10) f3/f1 = 1.104
(11) B2T/B2W = 3.392
(12) f1 − 3W/fW = 2.052
(13) f1 − 3T/f1 = 5.608
(14) T4/fT = 0.054
(15) nN − nP = 0.09390
(16) νP − νN = 23.78
(17) (nF − nR) · A(Y/3) = 0.0189
(18) A(Y/3)/A(Y/4) = 3.259

[Fourth Embodiment]

Figure 4:
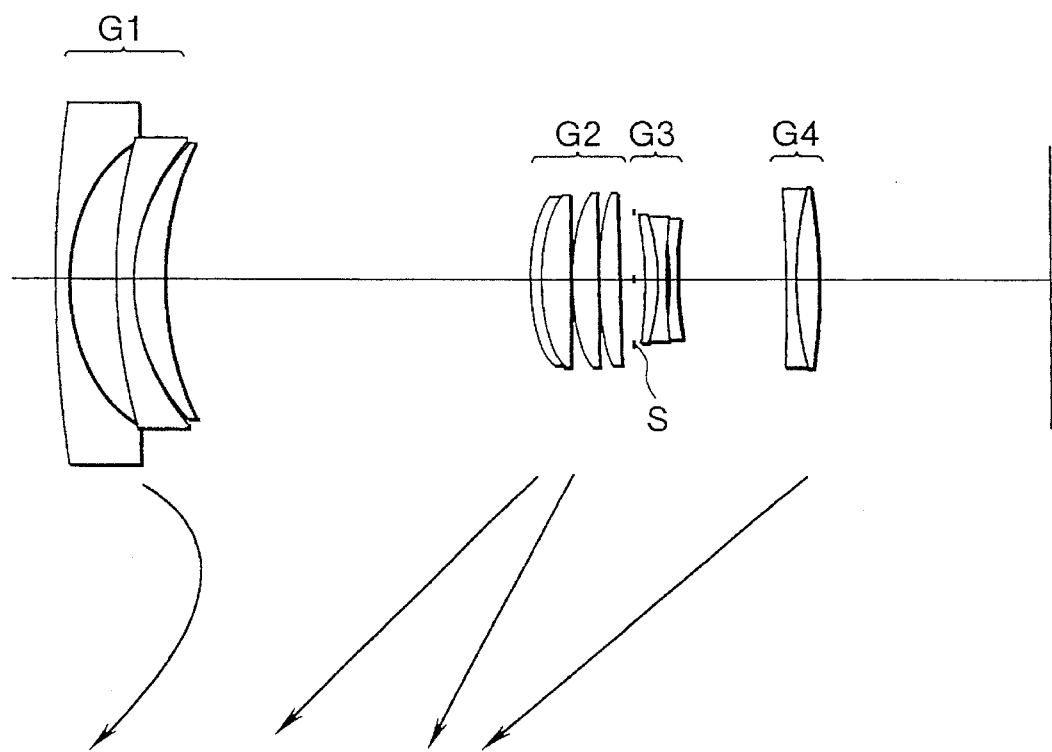
FIG. 4 is a view showing the lens arrangement according to a fourth embodiment of the present invention.

In the fourth embodiment, as shown in FIG. 4, a negative first lens unit G1 includes, in the following order from the object side, a negative meniscus lens having a convex surface facing the object side, a negative meniscus lens having an aspherical surface on its object side and a concave surface facing the image side, and a positive meniscus lens having a convex surface facing the object side. A positive second lens unit G2 includes, in the following order from the object side, a cemented lens of a negative meniscus lens having a convex surface facing the object side and a biconvex positive lens, a positive lens having a convex surface facing the object side, and a positive meniscus lens having a convex surface facing the object side. A negative third lens unit G3 includes, in the following order from the object side, a cemented lens of a positive meniscus lens having a concave surface facing the object side and a biconcave negative lens, and a biconcave negative lens. A positive fourth lens unit G4 includes, in the following order from the object side, a cemented lens of a negative lens having an aspherical surface on its object side and a biconvex positive lens. A stop S is located between the second and third lens units G2 and G3, and moves integrally with the third lens unit G3 upon zooming.

The data values and the condition corresponding values of the fourth embodiment will be summarized below.

TABLE 4

Data Values of Fourth Embodiment
f = 24.70 to 101.89
F = 3.60 to 5.75
2ω = 85.2 to 23.7°

|  | r | d | ν | n |
|---|---|---|---|---|
| 1 | 193.5896 | 2.0000 | 46.54 | 1.81584 |
| 2 | 27.2849 | 7.9573 |  |  |
| 3* | 155.4207 | 2.0000 | 70.45 | 1.48749 |
| 4 | 32.5605 | 0.2038 |  |  |
| 5 | 30.8988 | 5.6593 | 23.83 | 1.84666 |
| 6 | 54.0189 | D6 |  |  |
| 7 | 34.5395 | 1.1000 | 23.83 | 1.84666 |
| 8 | 22.5757 | 5.3891 | 70.45 | 1.48749 |
| 9 | −266.6545 | 0.1000 |  |  |
| 10 | 35.1228 | 3.7705 | 70.45 | 1.48749 |
| 11 | −22979.9760 | 0.1000 |  |  |
| 12 | 40.6230 | 3.1585 | 70.45 | 1.48749 |
| 13 | 333.5510 | D13 |  |  |
| 14 | (stop) | 1.5000 |  |  |
| 15 | −67.0372 | 2.5198 | 23.83 | 1.84666 |
| 16 | −26.3749 | 1.0000 | 52.16 | 1.51742 |
| 17 | 115.6416 | 0.7411 |  |  |
| 18 | −126.6914 | 1.1000 | 46.54 | 1.81584 |
| 19 | 72.5170 | D19 |  |  |
| 20* | 806.8021 | 1.2000 | 23.83 | 1.84666 |
| 21* | 41.8981 | 4.2707 | 46.54 | 1.81584 |
| 22 | −75.7538 | Bf |  |  |

Third Surface Aspherical Surface Coefficients k = 1.000          C4 = 0.3093 × 10$^{-5}$
C6 = 0.5745 × 10$^{-8}$    C8 = −0.9632 × 10$^{-11}$
C10 = 0.1871 × 10$^{-13}$ 20th Surface Aspherical Surface Coefficients k = 1.000          C4 = −0.1008 × 10$^{-4}$
C6 = −0.1253 × 10$^{-7}$   C8 = −0.1030 × 10$^{-9}$
C10 = 0.3724 × 10$^{-12}$ Change in Interval Upon Zooming

| f | 24.7046 | 49.0058 | 101.8905 |
|---|---|---|---|
| D6 | 58.2502 | 19.3312 | 2.0000 |
| D13 | 2.7899 | 8.1882 | 12.0878 |
| D19 | 17.1900 | 9.5718 | 2.0000 |
| Bf | 37.9972 | 55.1959 | 98.7309 |

TABLE 4-continued

Condition Corresponding Values (7) f1/fT = −0.378
(8) f3/fW = −1.791
(9) f4/fW = 3.658
(10) f3/f1 = 1.149
(11) B2T/B2W = 3.326
(12) f1 − 3W/fW = 1.730
(13) f1 − 3T/f1 = 28.09
(14) T4/fT = 0.054
(15) nN − nP = 0.03082
(16) vP − vN = 22.71
(17) (nF − nR) · A(Y/3) = 0.0249
(18) A(Y/3)/A(Y/4) = 3.289

[Fifth Embodiment]

Figure 5:
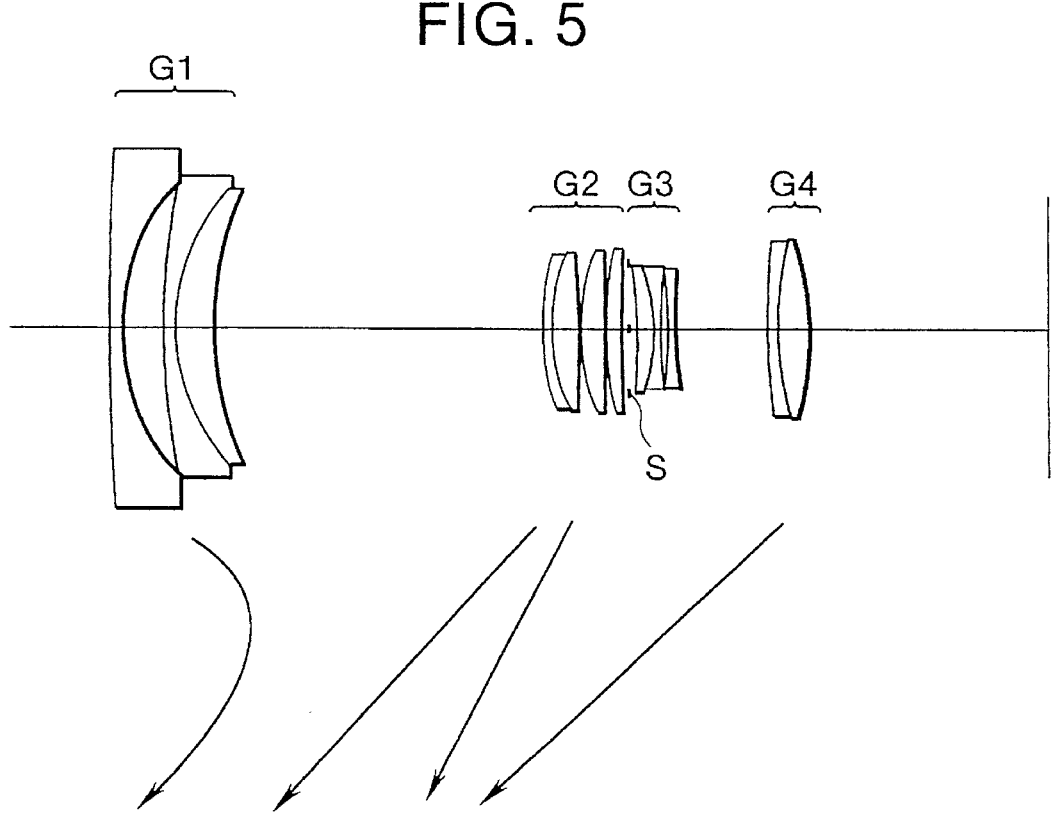
FIG. 5 is a view showing the lens arrangement according to a fifth embodiment of the present invention.

In the fifth embodiment, as shown in FIG. 5, a negative first lens unit G1 includes, in the following order from the object side, a negative lens having an aspherical surface on its object side and a concave surface facing the image side, and a cemented lens of a negative meniscus lens having a convex surface facing the object side and a positive meniscus lens having a convex surface facing the object side. A positive second lens unit G2 includes, in the following order from the object side, a cemented lens of a negative meniscus lens having a convex surface facing the object side and a biconvex positive lens, a positive meniscus lens having a convex surface facing the object side, and a positive meniscus lens having a convex surface facing the object side. A negative third lens unit G3 includes, in the following order from the object side, a cemented lens of a positive meniscus lens having a concave surface facing the object side and a biconcave negative lens, and a biconcave negative lens. A positive fourth lens unit G4 includes, in the following order from the object side, a cemented lens of a negative lens having an aspherical surface on its object side and a biconvex positive lens. A stop S is located between the second and third lens units G2 and G3, and moves integrally with the third lens unit G3 upon zooming.

The data values and the condition corresponding values of the fifth embodiment will be summarized below.

TABLE 5

Data Values of Fifth Embodiment
f = 24.70 to 101.86
F = 3.67 to 5.99
2ω = 85.3 to 23.8°

| | r | d | v | n |
|---|---|---|---|---|
| 1* | −1605.4200 | 2.0000 | 42.97 | 1.83500 |
| 2 | 32.9109 | 6.7004 | | |
| 3 | 143.9710 | 2.0000 | 70.45 | 1.48749 |
| 4 | 29.5201 | 5.9264 | 23.83 | 1.84666 |
| 5 | 53.8745 | D5 | | |
| 6 | 45.1454 | 1.1000 | 23.83 | 1.84666 |
| 7 | 25.5773 | 4.5801 | 70.45 | 1.48749 |
| 8 | −123.6291 | 0.1000 | | |
| 9 | 30.0545 | 3.7065 | 64.20 | 1.51680 |
| 10 | 328.0298 | 0.1000 | | |
| 11 | 34.6513 | 2.9698 | 59.44 | 1.58313 |
| 12 | 120.4928 | D12 | | |
| 13 | (stop) | 1.5000 | | |
| 14 | −334.0987 | 2.9046 | 33.27 | 1.80610 |
| 15 | −28.2351 | 1.0000 | 64.20 | 1.51680 |
| 16 | 43.1811 | 1.6191 | | |
| 17 | −54.6920 | 1.1000 | 46.54 | 1.81584 |
| 18 | 136.8433 | D18 | | |
| 19* | 96.9585 | 1.2000 | 23.83 | 1.84666 |
| 20 | 45.1047 | 5.3598 | 70.45 | 1.48749 |
| 21* | −39.2857 | Bf | | |

TABLE 5-continued

First Surface Aspherical Surface Coefficients k = 1.000        C4 = 0.2175 × 10⁻⁵
C6 = −0.6822 × 10⁻⁹    C8 = −0.2754 × 10⁻¹²
C10 = 0.4061 × 10⁻¹⁵

19th Surface Aspherical Surface Coefficients k = 1.000        C4 = −0.1234 × 10⁻⁴
C6 = −0.2421 × 10⁻⁷    C8 = 0.6472 × 10⁻¹⁰
C10 = −0.3629 × 10⁻¹¹

Change in Interval Upon Zooming

| f | 24.6964 | 48.9891 | 101.8551 |
|---|---|---|---|
| D5 | 52.2024 | 16.9518 | 1.0000 |
| D12 | 1.0000 | 5.1699 | 9.0763 |
| D18 | 14.9309 | 7.5126 | 1.0000 |
| Bf | 38.0891 | 56.5842 | 97.5573 |

Condition Corresponding Values (7) f1/fT = −0.370
(8) f3/fW = −1.611
(9) f4/fW = 3.087
(10) f3/f1 = 1.057
(11) B2T/B2W = 3.281
(12) f1 − 3W/fW = 2.033
(13) f1 − 3T/f1 = 9.389
(14) T4/fT = 0.064
(15) nN − nP = 0.35917
(16) vP − vN = 46.62
(17) (nF − nR) · A(Y/3) = 0.0306
(18) A(Y/3)/A(Y/4) = 3.276

[Sixth Embodiment]

Figure 6:
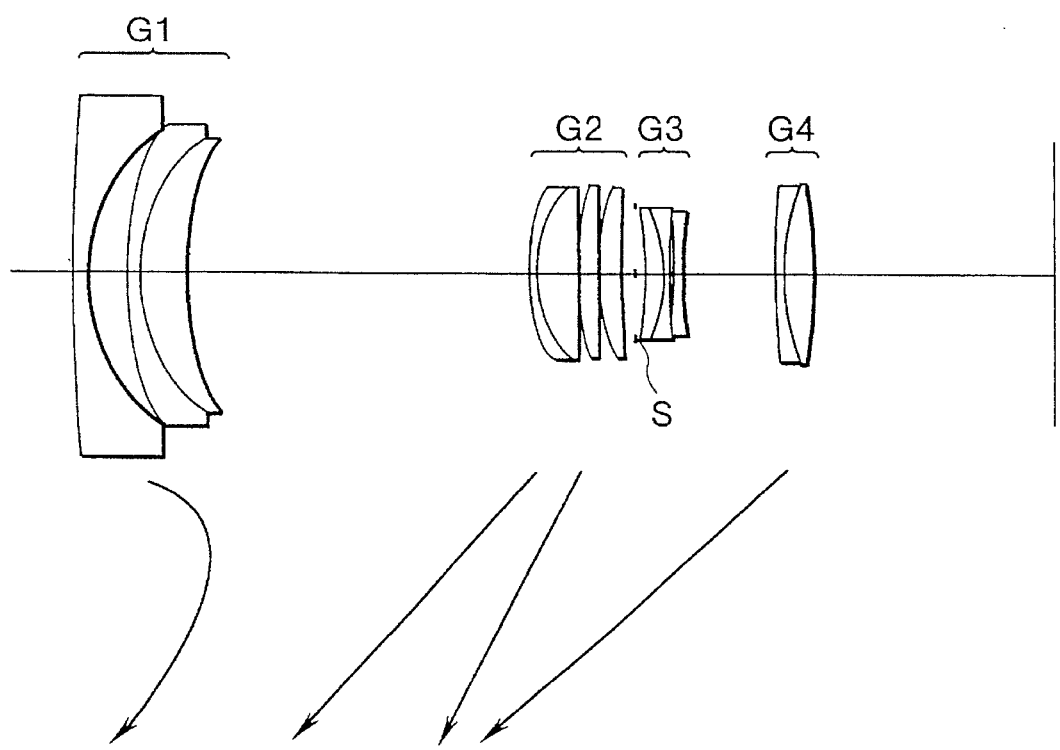
FIG. 6 is a view showing the lens arrangement according to a sixth embodiment of the present invention.

In the sixth embodiment, as shown in FIG. 6, a negative first lens unit G1 includes, in the following order from the object side, a negative meniscus lens having a convex surface facing the object side, and a cemented lens of a negative meniscus lens having an aspherical surface on its object side and a concave surface facing the image side and a positive meniscus lens having a convex surface facing the object side. A positive second lens unit G2 includes, in the following order from the object side, a cemented lens of a negative meniscus lens having a convex surface facing the object side and a biconvex positive lens, a positive lens having a convex surface facing the object side, and a positive meniscus lens having a convex surface facing the object side. A negative third lens unit G3 includes, in the following order from the object side, a cemented lens of a positive meniscus lens having a concave surface facing the object side and a negative lens having a concave surface facing the object side, and a biconcave negative lens. A positive fourth lens unit G4 includes, in the following order from the object side, a cemented lens of a negative lens having an aspherical surface on its object side and a biconvex positive lens. A stop S is located between the second and third lens units G2 and G3, and moves integrally with the third lens unit G3 upon zooming.

The data values and the condition corresponding values of the sixth embodiment will be summarized below.

TABLE 6

Data Values of Sixth Embodiment
f = 24.70 to 101.86
F = 3.60 to 5.75
2ω = 85.2 to 23.8°

| | r | d | v | n |
|---|---|---|---|---|
| 1 | 309.7833 | 2.0000 | 42.97 | 1.83500 |
| 2 | 26.6425 | 6.7487 | | |
| 3* | 71.7975 | 2.0000 | 70.45 | 1.48749 |

TABLE 6-continued

| | | | | |
|---|---|---|---|---|
| 4 | 27.5830 | 6.9066 | 23.83 | 1.84666 |
| 5 | 48.3051 | D5 | | |
| 6 | 29.5142 | 1.1000 | 23.83 | 1.84666 |
| 7 | 20.0870 | 5.9407 | 70.45 | 1.48749 |
| 8 | −736.3842 | 0.1000 | | |
| 9 | 43.7188 | 3.3090 | 64.20 | 1.51680 |
| 10 | 745.4483 | 0.1000 | | |
| 11 | 32.9068 | 3.6236 | 70.45 | 1.48749 |
| 12 | 191.0314 | D12 | | |
| 13 | (stop) | 1.5000 | | |
| 14 | −55.8199 | 3.0283 | 25.46 | 1.80518 |
| 15 | −21.9569 | 1.0000 | 56.27 | 1.50137 |
| 16 | 447.9461 | 0.6896 | | |
| 17 | −93.6497 | 1.1000 | 46.54 | 1.81584 |
| 18 | 62.4718 | D18 | | |
| 19* | 101.1392 | 1.2000 | 23.83 | 1.84666 |
| 20 | 29.7281 | 5.0317 | 47.50 | 1.78800 |
| 21 | −110.1780 | Bf | | |

Third Surface Aspherical Surface Coefficients $k = 1.000$
$C4 = 0.4748 \times 10^{-5}$
$C6 = 0.1037 \times 10^{-7}$
$C8 = -0.1861 \times 10^{-10}$
$C10 = 0.3579 \times 10^{-13}$ 19th Surface Aspherical Surface Coefficients $k = 1.000$
$C4 = -0.1022 \times 10^{-4}$
$C6 = -0.1679 \times 10^{-7}$
$C8 = 0.1558 \times 10^{-10}$
$C10 = -0.1542 \times 10^{-12}$ Change in Interval Upon Zooming

| f | 24.6961 | 48.9889 | 101.8571 |
|---|---|---|---|
| D5 | 54.1778 | 18.1640 | 2.0000 |
| D12 | 2.5000 | 7.3623 | 10.5888 |
| D18 | 14.9439 | 8.3828 | 2.0000 |
| Bf | 38.0902 | 55.7969 | 100.0880 |

Condition Corresponding Values (7) $f1/fT = -0.374$
(8) $f3/fW = -1.701$
(9) $f4/fW = 3.023$
(10) $f3/f1 = 1.103$
(11) $B2T/B2W = 3.301$
(12) $f1 - 3W/fW = 2.144$
(13) $f1 - 3T/f1 = 7.349$
(14) $T4/fT = 0.061$
(15) $nN - nP = 0.05866$
(16) $vP - vN = 23.67$
(17) $(nF - nR) \cdot A(Y/3) = 0.0252$
(18) $A(Y/3)/A(Y/4) = 3.269$

[Seventh Embodiment]

Figure 7:
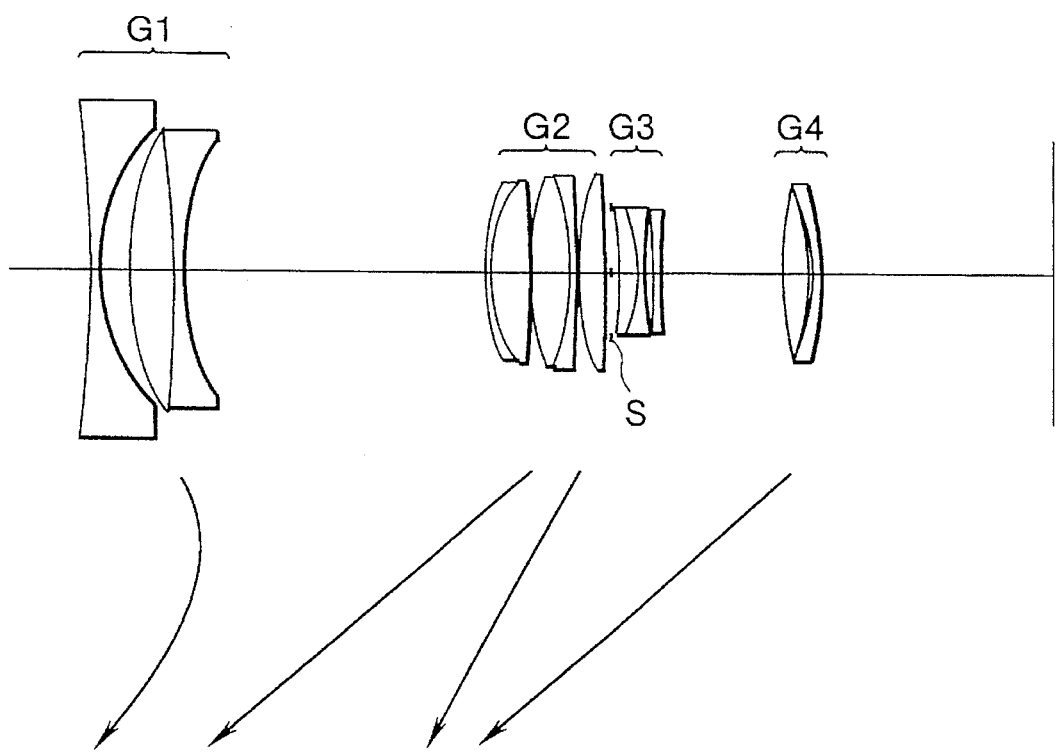
FIG. 7 is a view showing the lens arrangement according to a seventh embodiment of the present invention.

In the seventh embodiment, as shown in FIG. 7, a negative first lens unit G1 includes, in the following order from the object side, a biconcave negative lens having an aspherical surface on its image side, and a cemented lens of a biconvex positive lens and a biconcave negative lens. A positive second lens unit G2 includes, in the following order from the object side, a cemented lens of a negative meniscus lens having a convex surface facing the object side and a biconvex positive lens, a cemented lens of a biconvex positive lens and a negative meniscus lens having a concave surface facing the object side, and a biconvex positive lens. A negative third lens unit G3 includes, in the following order from the object side, a cemented lens of a positive meniscus lens having a concave surface facing the object side and a biconcave negative lens, and a negative lens having a concave surface facing the object side. A positive fourth lens unit G4 includes, in the following order from the object side, a biconvex positive lens having an aspherical surface on its image side, and a negative meniscus lens having a concave surface facing the object side. A stop S is located between the second and third lens units G2 and G3, and moves integrally with the third lens unit G3 upon zooming.

The data values and the condition corresponding values of the seventh embodiment will be summarized below.

TABLE 7

Data Values of Seventh Embodiment
$f = 24.70$ to $117.00$
$F = 3.81$ to $5.83$
$2\omega = 85.8$ to $20.6°$

| | r | d | v | n |
|---|---|---|---|---|
| 1 | −201.6716 | 1.7000 | 45.06 | 1.74400 |
| 2* | 26.9346 | 4.8095 | | |
| 3 | 50.6776 | 6.5000 | 25.36 | 1.80518 |
| 4 | −208.1603 | 1.5000 | 60.35 | 1.62041 |
| 5 | 39.5855 | D5 | | |
| 6 | 38.8378 | 1.0000 | 25.36 | 1.80518 |
| 7 | 26.9488 | 5.4843 | 70.24 | 1.48749 |
| 8 | −319.9544 | 0.1000 | | |
| 9 | 41.0170 | 6.6185 | 70.24 | 1.48749 |
| 10 | −37.0346 | 1.0000 | 36.54 | 1.83060 |
| 11 | −133.8048 | 0.1000 | | |
| 12 | 42.6802 | 3.8492 | 60.35 | 1.62041 |
| 13 | −375.5904 | D13 | | |
| 14 | (stop) | 1.5000 | | |
| 15 | −107.5493 | 3.0270 | 27.64 | 1.75520 |
| 16 | −25.6650 | 1.0000 | 54.62 | 1.51454 |
| 17 | 56.8089 | 1.6638 | | |
| 18 | −60.2616 | 1.0000 | 45.06 | 1.74400 |
| 19 | 417.0931 | D19 | | |
| 20 | 50.0836 | 4.2300 | 70.45 | 1.48749 |
| 21* | −35.4440 | 0.8000 | | |
| 22 | −30.7404 | 1.0000 | 25.36 | 1.80518 |
| 23 | −52.3046 | Bf | | |

Second Surface Aspherical Surface Coefficients $k = 1.000$
$C4 = -0.8887 \times 10^{-5}$
$C6 = -0.6719 \times 10^{-8}$
$C8 = 0.1400 \times 10^{-11}$
$C10 = -0.1320 \times 10^{-13}$ 21st Surface Aspherical Surface Coefficients $k = 1.000$
$C4 = 0.1593 \times 10^{-4}$
$C6 = 0.1829 \times 10^{-7}$
$C8 = -0.1448 \times 10^{-10}$
$C10 = 0.1429 \times 10^{-12}$ Change in Interval Upon Zooming

| f | 24.6998 | 48.9994 | 116.9981 |
|---|---|---|---|
| D5 | 47.9962 | 17.2434 | 0.8820 |
| D13 | 0.8807 | 8.3246 | 27.0244 |
| D19 | 19.6307 | 11.4171 | 0.9108 |
| Bf | 37.9344 | 56.4139 | 93.5704 |

Condition Corresponding Values (7) $f1/fT = -0.276$
(8) $f3/fW = -1.915$
(9) $f4/fW = 3.157$
(10) $f3/f1 = 1.467$
(11) $B2T/B2W = 4.133$
(12) $f1 - 3W/fW = 2.134$
(13) $f1 - 3T/f1 = 14.81$
(14) $T4/fT = 0.052$
(15) $nN - nP = 0.31769$
(16) $vP - vN = 45.09$
(17) $(nF - nR) \cdot A(Y/3) = 0.0221$
(18) $A(Y/3)/A(Y/4) = 3.239$

[Eighth Embodiment]

Figure 8:
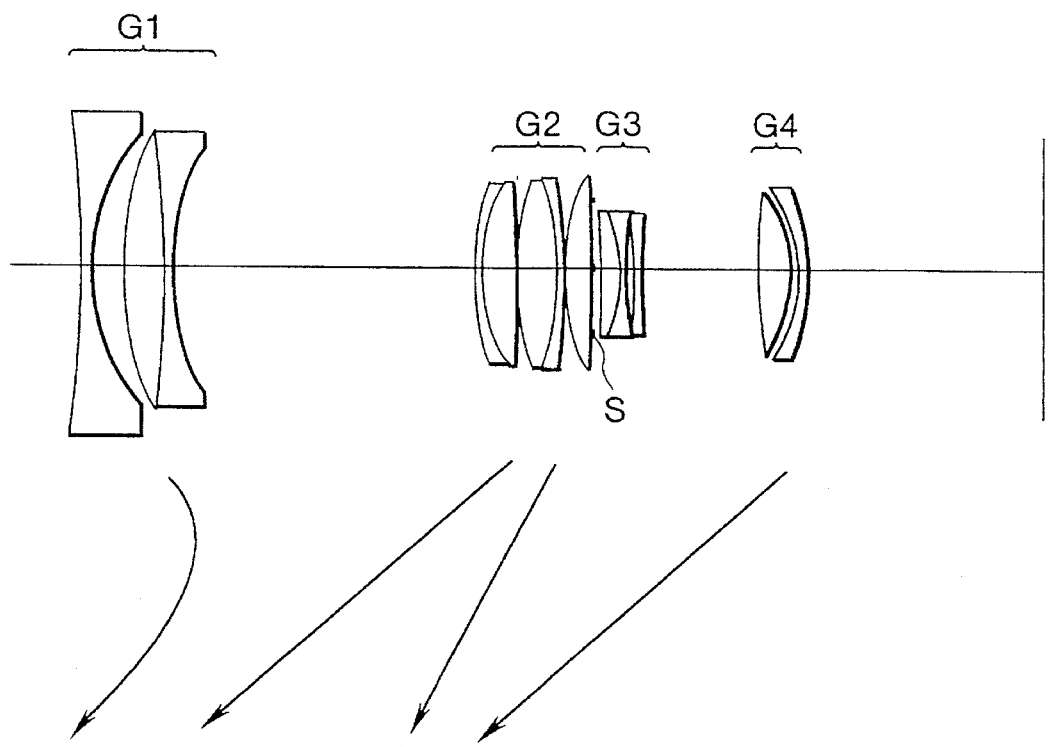
FIG. 8 is a view showing the lens arrangement according to a eighth embodiment of the present invention.

In the eighth embodiment, as shown in FIG. 8, a negative first lens unit G1 includes, in the following order from the object side, a biconcave negative lens having an aspherical surface on its image side, and a cemented lens of a biconvex positive lens and a biconcave negative lens. A positive second lens unit G2 includes, in the following order from the object side, a cemented lens of a negative meniscus lens having a convex surface facing the object side and a positive lens, a cemented lens of a biconvex positive lens and a negative meniscus lens having a concave surface facing the object side, and a positive lens having a convex surface facing the object side. A negative third lens unit G3 includes, in the following order from the object side, a cemented lens of a positive meniscus lens having a concave surface facing the object side and a biconcave negative lens, and a biconcave negative lens. A positive fourth lens unit G4 includes, in the following order from the object side, a biconvex positive lens having an aspherical surface on its object side, and a negative meniscus lens having a concave surface facing the object side. A stop S is located between the second and third lens units G2 and G3, and moves integrally with the third lens unit G3 upon zooming.

The data values and the condition corresponding values of the eighth embodiment will be summarized below.

TABLE 8

Data Values of Eighth Embodiment
$f = 24.70$ to $117.00$
$F = 3.64$ to $5.71$
$2\omega = 85.7$ to $20.6°$

|  | r | d | ν | n |
|---|---|---|---|---|
| 1 | −185.4736 | 1.7000 | 45.06 | 1.74400 |
| 2* | 29.0248 | 4.8095 |  |  |
| 3 | 52.7710 | 6.5000 | 25.36 | 1.80518 |
| 4 | −185.9420 | 1.5000 | 60.35 | 1.62041 |
| 5 | 37.3660 | D5 |  |  |
| 6 | 40.9787 | 1.0000 | 25.36 | 1.80518 |
| 7 | 26.5733 | 5.4843 | 70.24 | 1.48749 |
| 8 | −946.8218 | 0.1000 |  |  |
| 9 | 43.5588 | 6.6185 | 70.24 | 1.48749 |
| 10 | −37.4191 | 1.0000 | 36.54 | 1.83060 |
| 11 | −102.2475 | 0.1000 |  |  |
| 12 | 37.0885 | 3.8492 | 60.35 | 1.62041 |
| 13 | −2401.0895 | D13 |  |  |
| 14 | (stop) | 1.5000 |  |  |
| 15 | −313.1685 | 3.0270 | 27.64 | 1.75520 |
| 16 | −27.1198 | 1.0000 | 54.62 | 1.51454 |
| 17 | 55.5144 | 1.6638 |  |  |
| 18 | −50.6068 | 1.0000 | 45.06 | 1.74400 |
| 19 | 209.4798 | D19 |  |  |
| 20* | 81.0024 | 5.0000 | 70.45 | 1.48749 |
| 21 | −23.8966 | 1.3350 |  |  |
| 22 | −20.6375 | 1.5000 | 25.36 | 1.80518 |
| 23 | −32.4297 | Bf |  |  |

Second Surface Aspherical Surface Coefficients $k = 1.000$
$C6 = -0.7413 \times 10^{-8}$
$C10 = -0.1430 \times 10^{-13}$
$C4 = -0.7932 \times 10^{-5}$
$C8 = 0.9211 \times 10^{-11}$ 20th Surface Aspherical Surface Coefficients $k = 1.000$
$C6 = -0.4082 \times 10^{-9}$
$C10 = 0.2199 \times 10^{-12}$
$C4 = -0.1262 \times 10^{-4}$
$C8 = -0.9722 \times 10^{-10}$ Change in Interval Upon Zooming

| f | 24.6998 | 48.9996 | 116.9986 |
|---|---|---|---|
| D5 | 47.8760 | 17.1232 | 0.7618 |
| D13 | 0.4945 | 7.9384 | 26.6382 |
| D19 | 19.1580 | 10.9444 | 0.4381 |
| Bf | 37.8726 | 56.3523 | 93.5090 |

Condition Corresponding Values (7) f1/fT = −0.276
(8) f3/fW = −1.915
(9) f4/fW = 3.157
(10) f3/f1 = 1.467
(11) B2T/B2W = 4.133
(12) f1 − 3W/fW = 2.134
(13) f1 − 3T/f1 = 14.81
(14) T4/fT = 0.067
(15) nN − nP = 0.31769
(16) νP − νN = 45.09
(17) (nF − nR) · A(Y/3) = 0.0169
(18) A(Y/3)/A(Y/4) = 3.200

[Ninth Embodiment]

Figure 9:
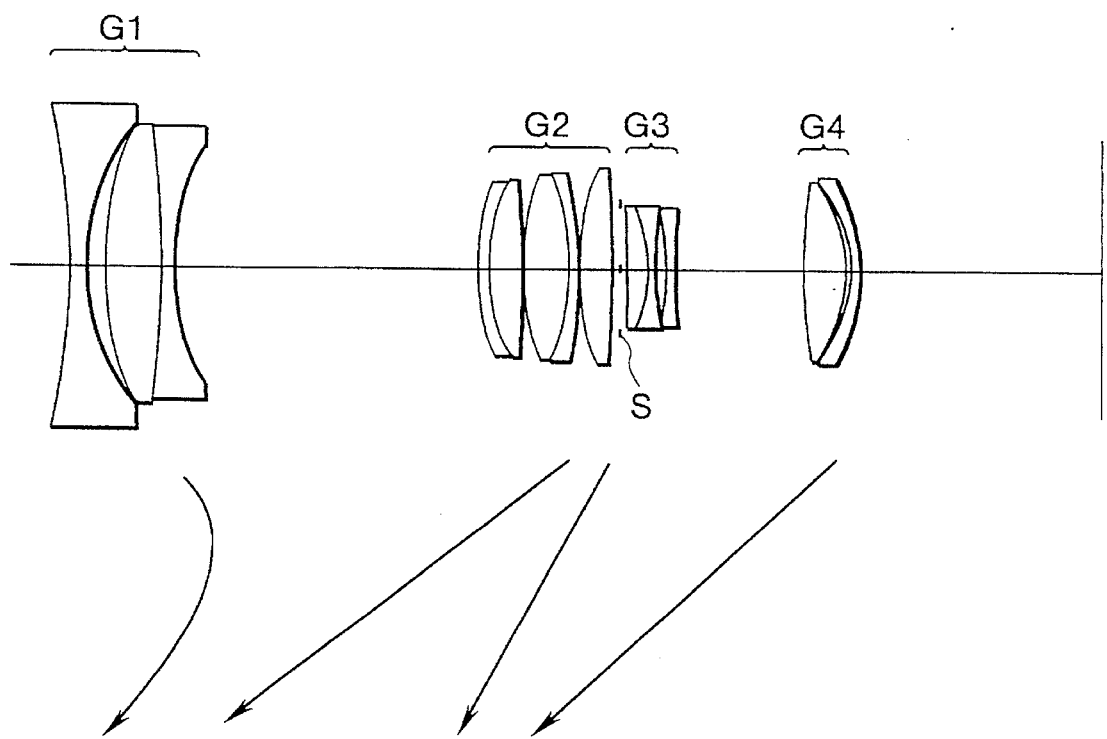
FIG. 9 is a view showing the lens arrangement according to a ninth embodiment of the present invention.
Figure 10:
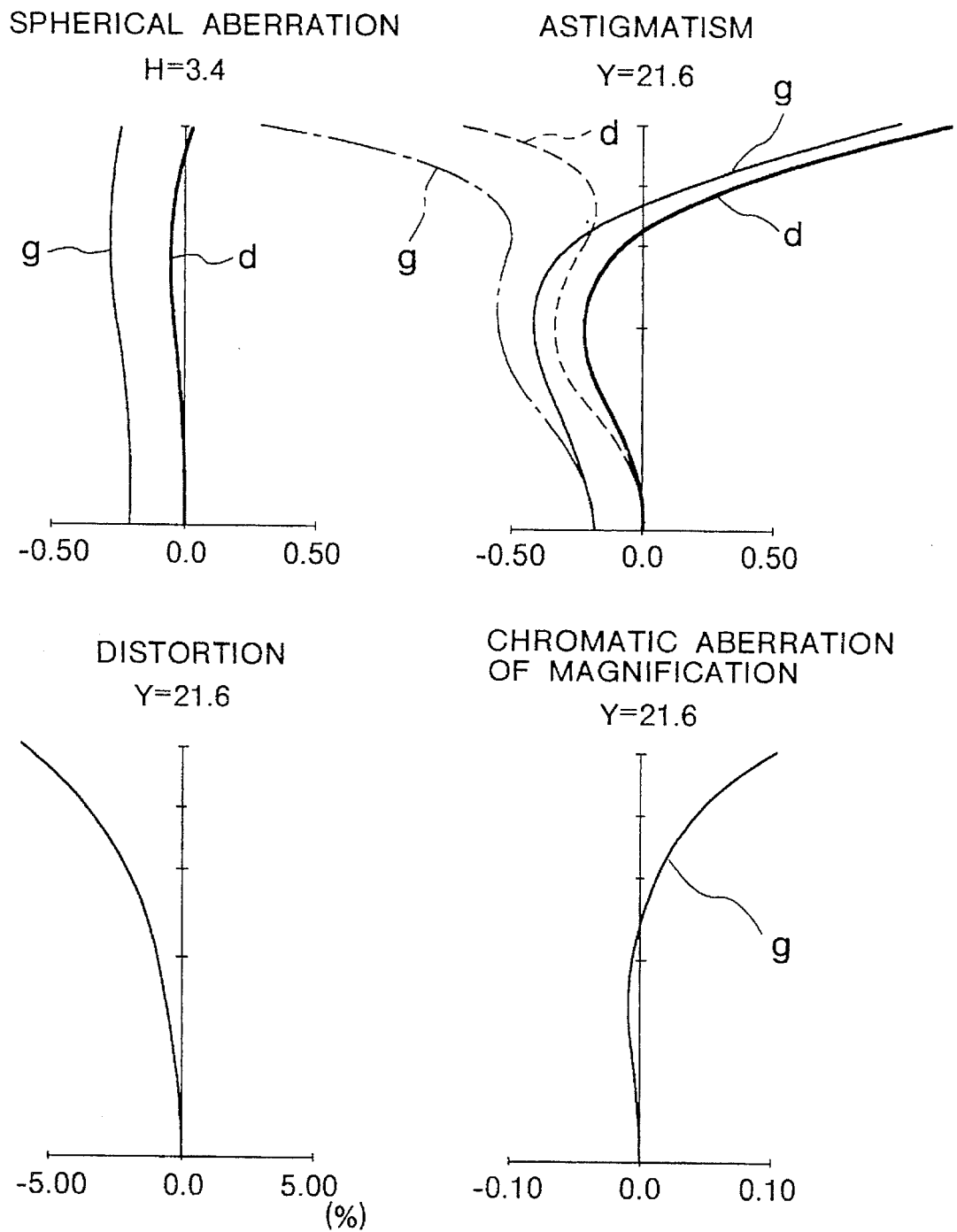
FIG. 10 shows graphs of various aberrations at the wide-angle end according to the first embodiment of the present invention.
Figure 11:
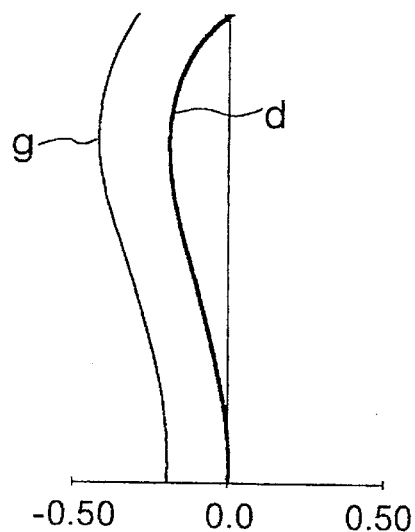
FIG. 11 shows graphs of various aberrations in an intermediate focal length state according to the first embodiment of the present invention.
Figure 11:
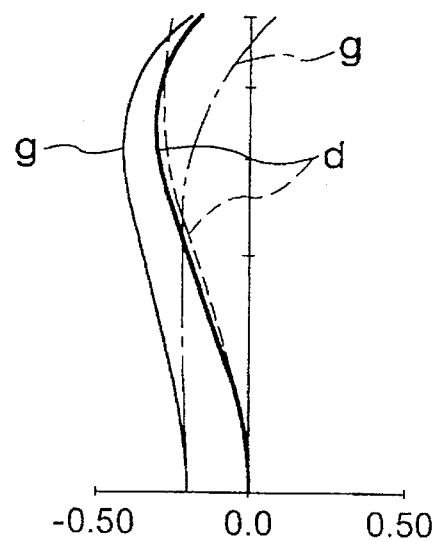
Figure 11:
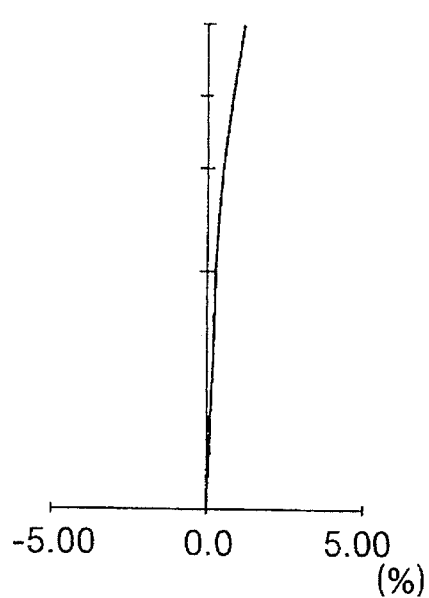
Figure 11:
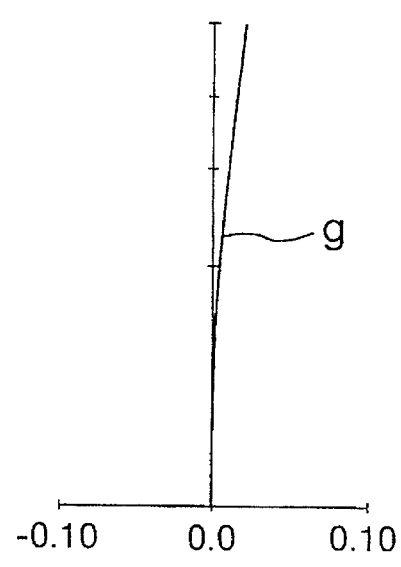
Figure 12:
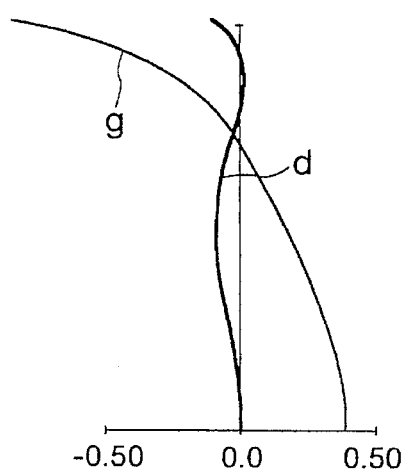
FIG. 12 shows graphs of various aberrations at the telephoto end according to the first embodiment of the present invention.
Figure 12:
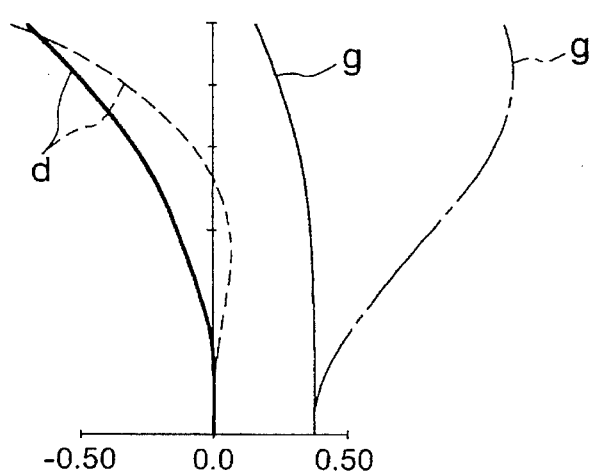
Figure 12:
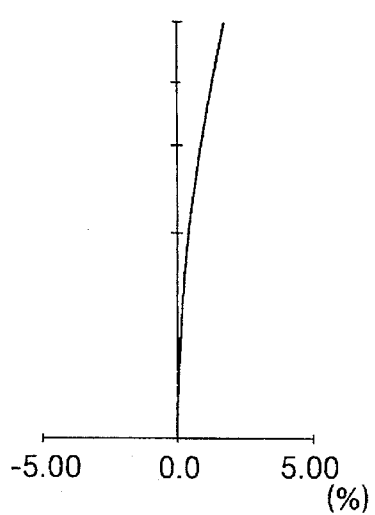
Figure 12:
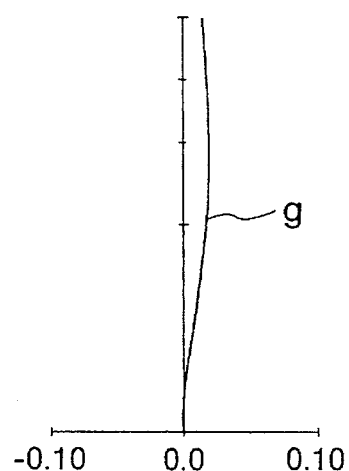
Figure 13:
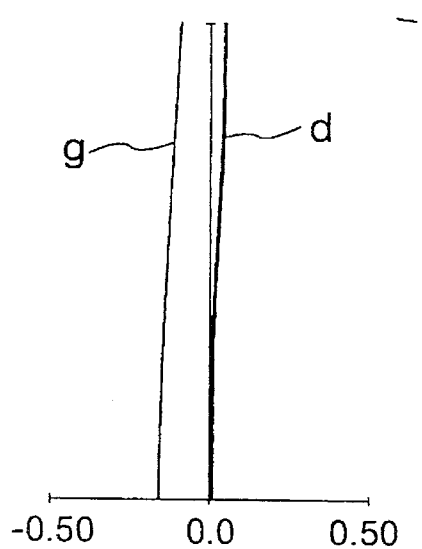
FIG. 13 shows graphs of various aberrations at the wide-angle end according to the second embodiment of the present invention.
Figure 13:
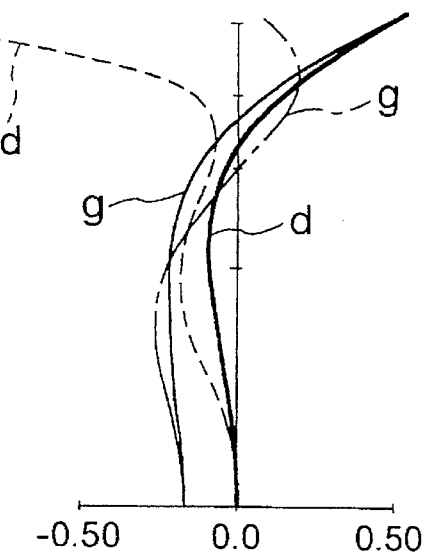
Figure 13:
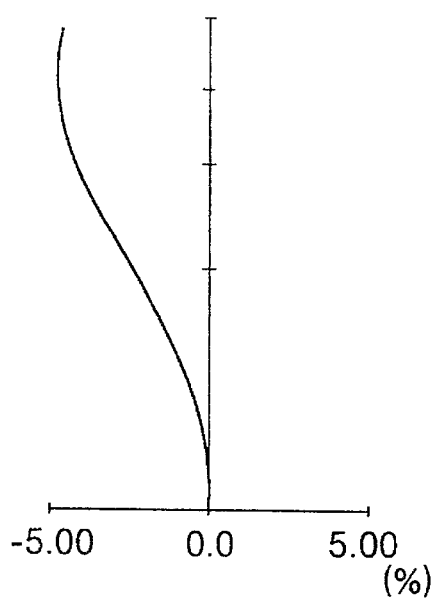
Figure 13:
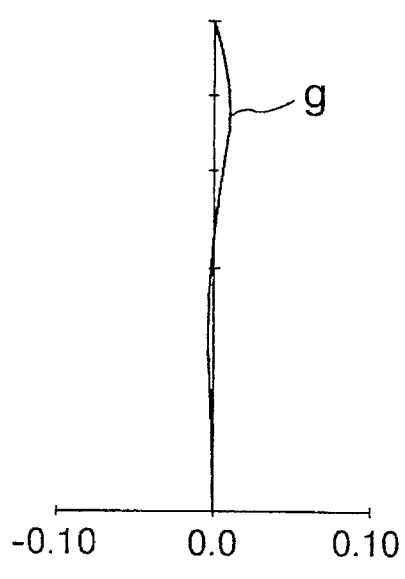
Figure 14:
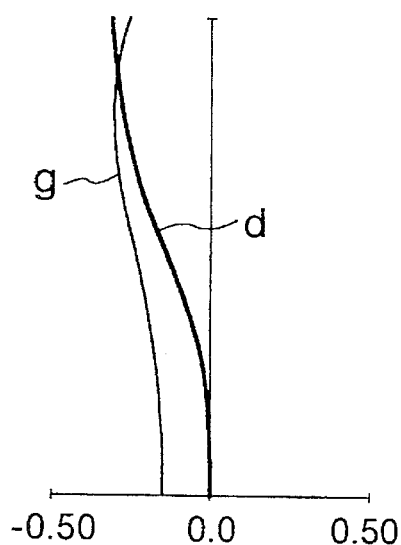
FIG. 14 shows graphs of various aberrations in an intermediate focal length state according to the second embodiment of the present invention.
Figure 14:
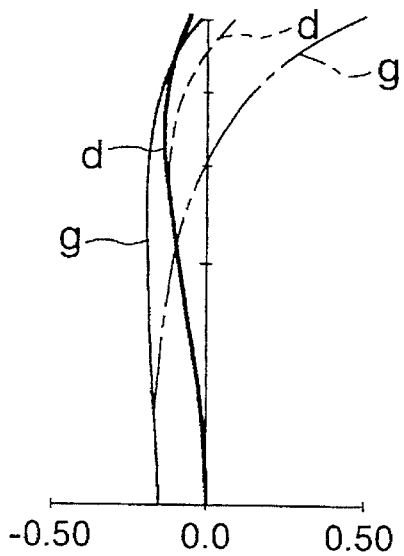
Figure 14:
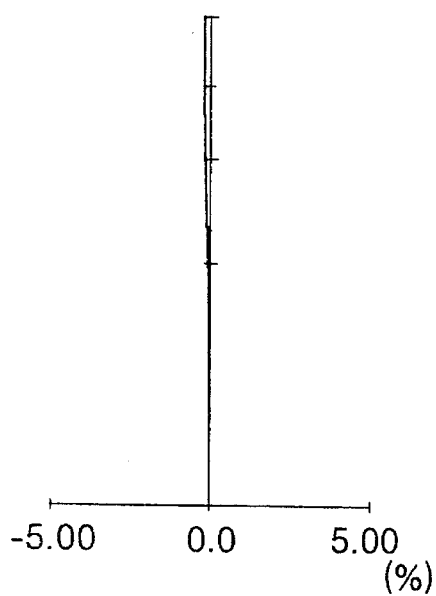
Figure 14:
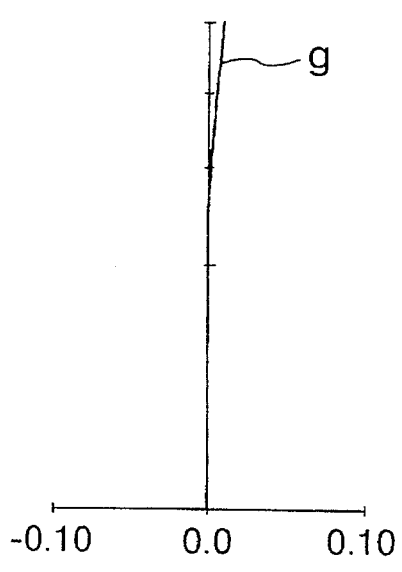
Figure 15:
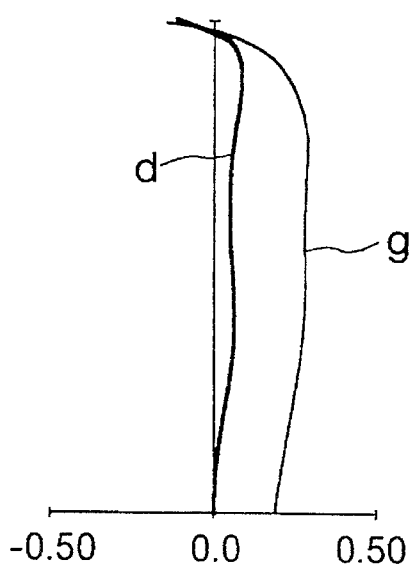
FIG. 15 shows graphs of various aberrations at the telephoto end according to the second embodiment of the present invention.
Figure 15:
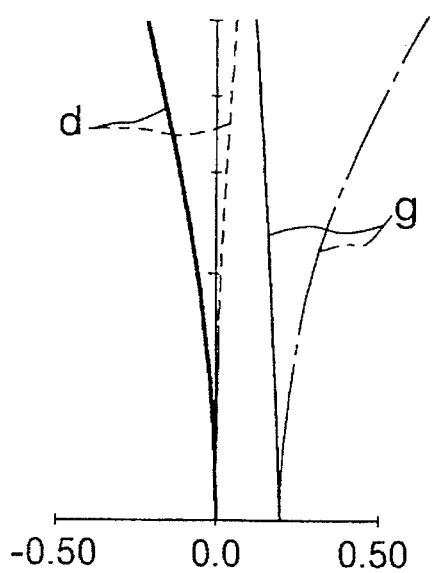
Figure 15:
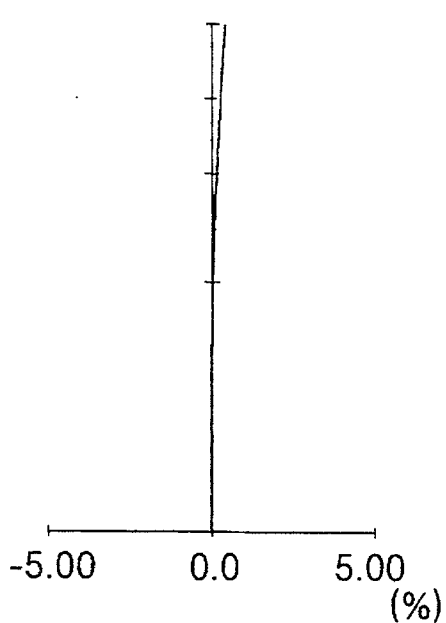
Figure 15:
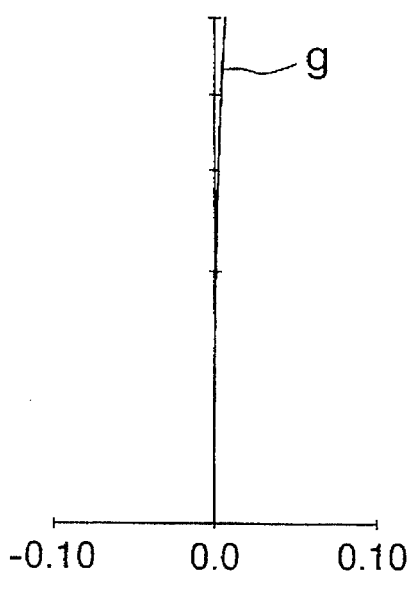
Figure 16:
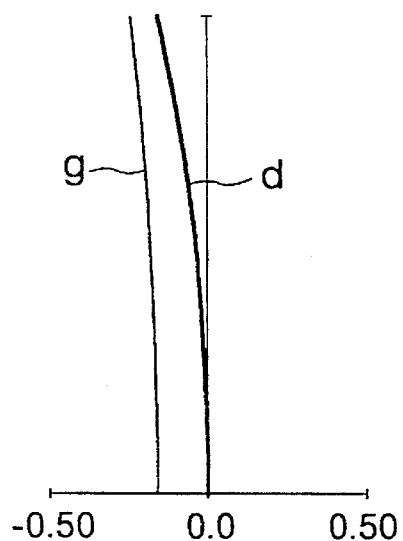
FIG. 16 shows graphs of various aberrations at the wide-angle end according to the third embodiment of the present invention.
Figure 16:
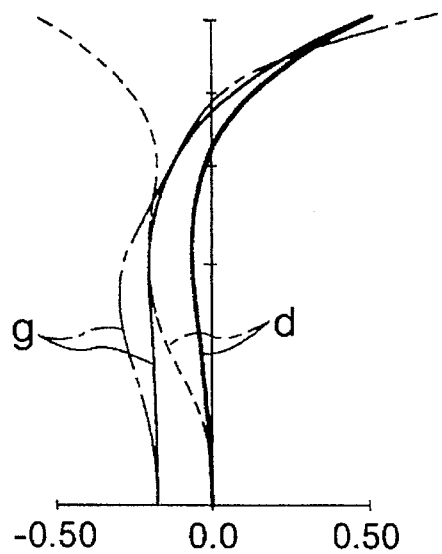
Figure 16:
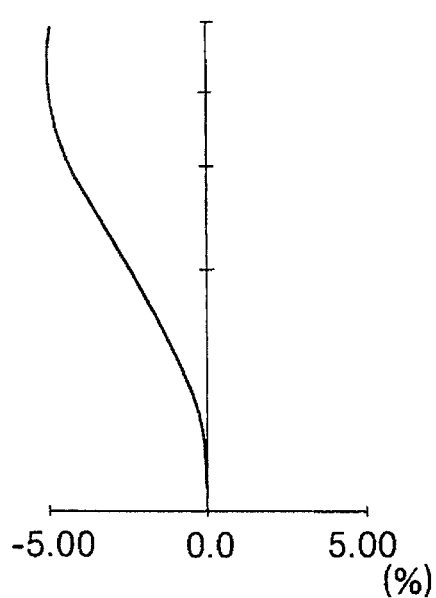
Figure 16:
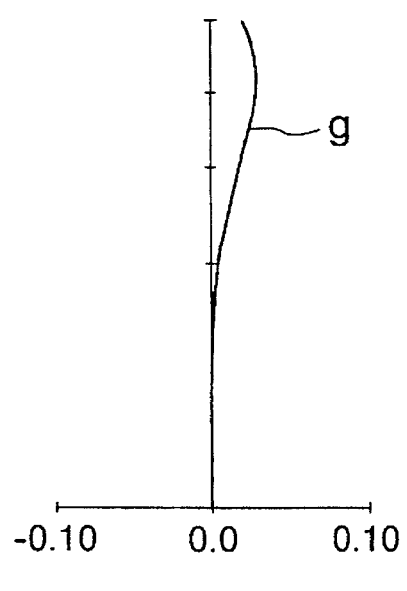
Figure 17:
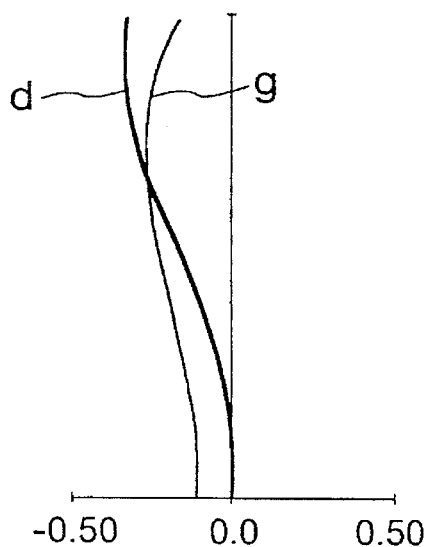
FIG. 17 shows graphs of various aberrations in an intermediate focal length state according to the third embodiment of the present invention.
Figure 17:
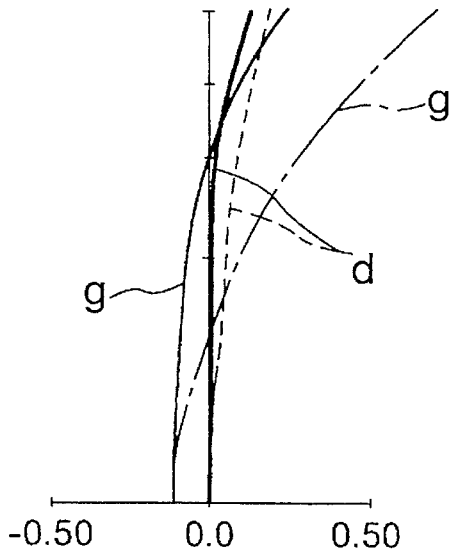
Figure 17:
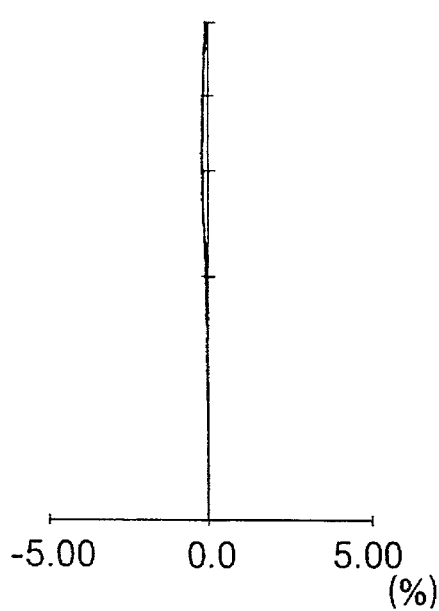
Figure 17:
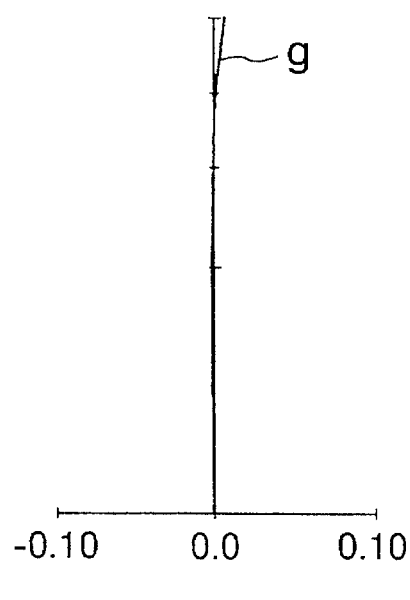
Figure 18:
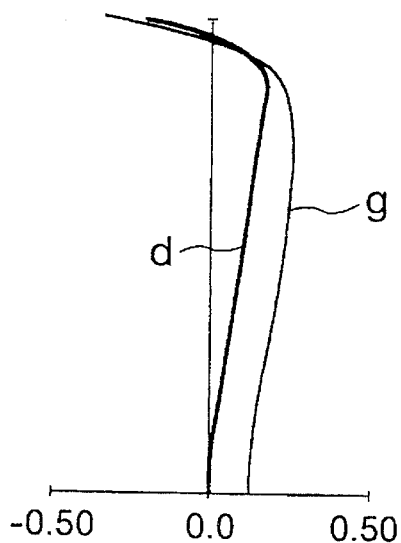
FIG. 18 shows graphs of various aberrations at the telephoto end according to the third embodiment of the present invention.
Figure 18:
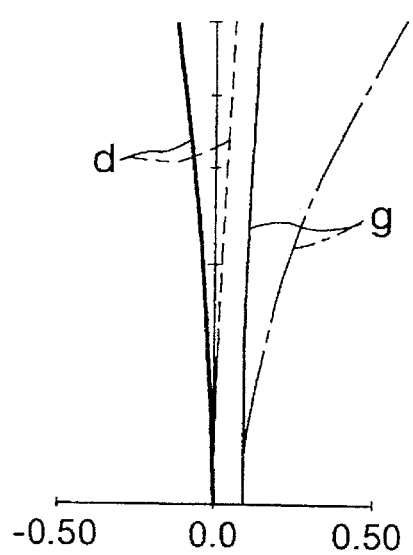
Figure 18:
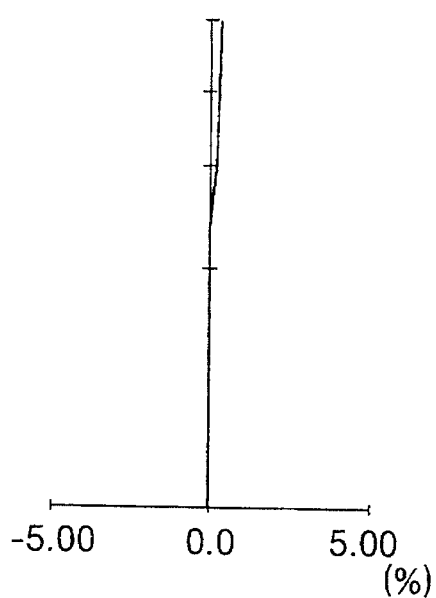
Figure 18:
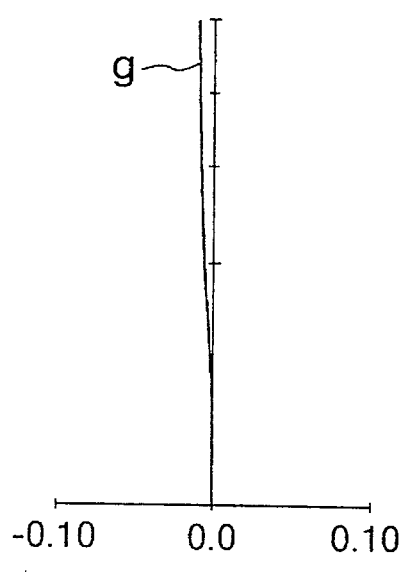
Figure 19:
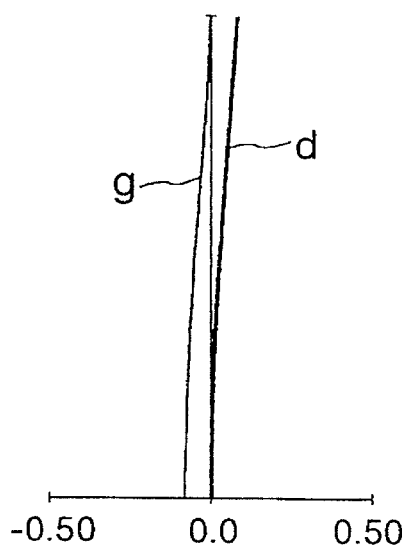
FIG. 19 shows graphs of various aberrations at the wide-angle end according to the fourth embodiment of the present invention.
Figure 19:
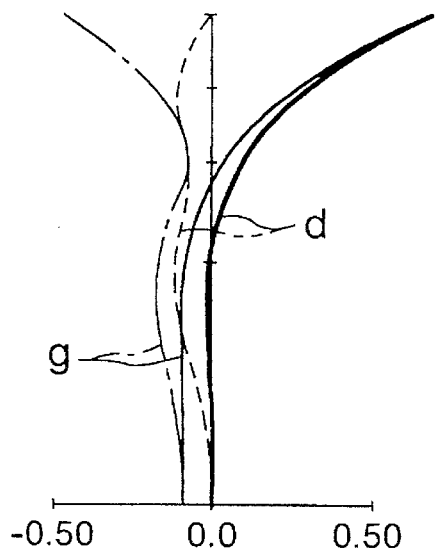
Figure 19:
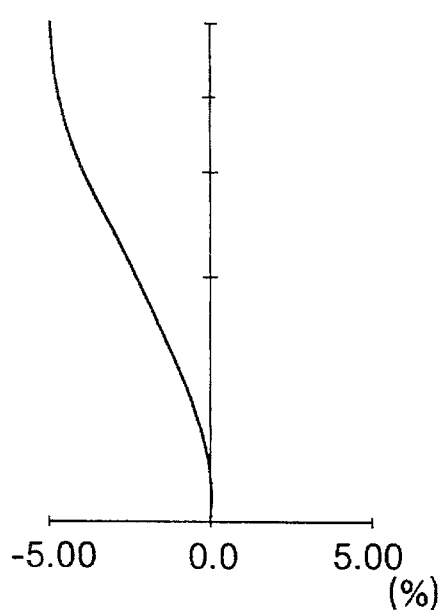
Figure 19:
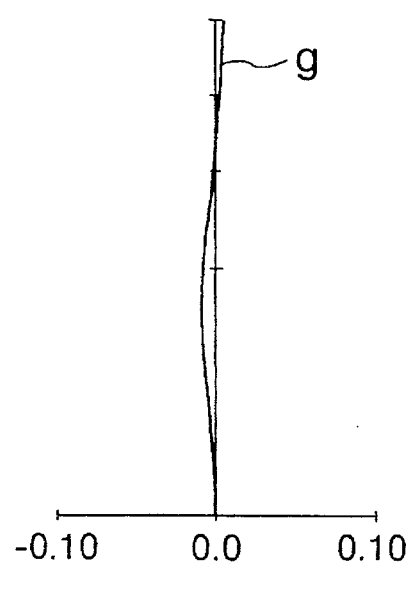
Figure 20:
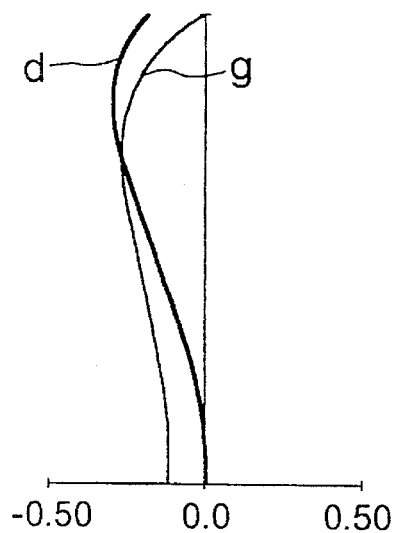
FIG. 20 shows graphs of various aberrations in an intermediate focal length state according to the fourth embodiment of the present invention.
Figure 20:
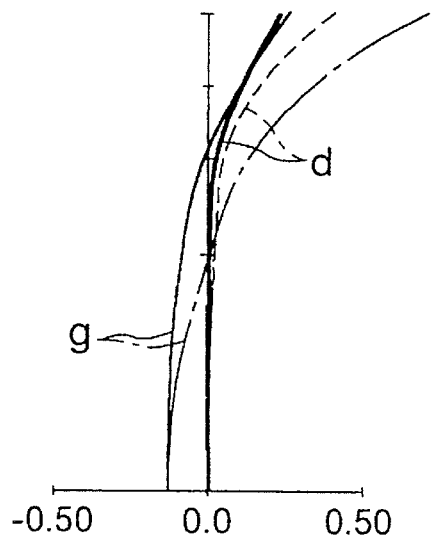
Figure 20:
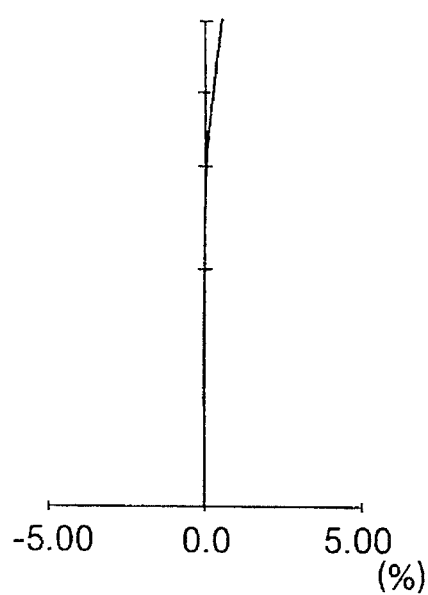
Figure 20:
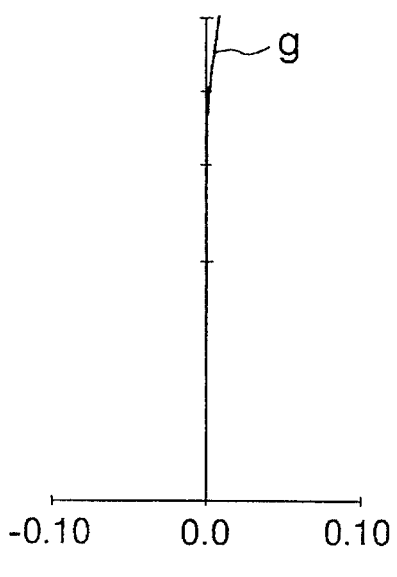
Figure 21:
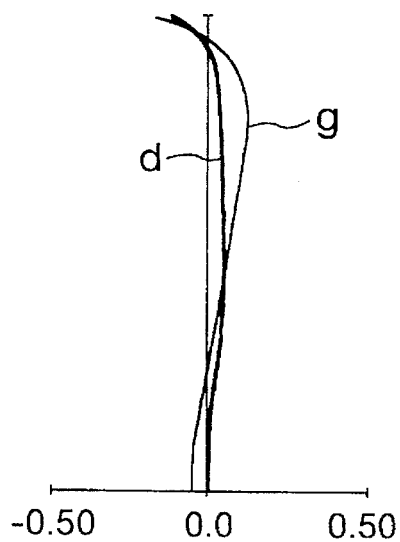
FIG. 21 shows graphs of various aberrations at the telephoto end according to the fourth embodiment of the present invention.
Figure 21:
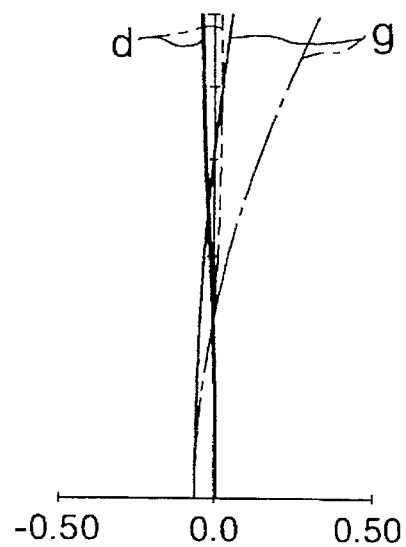
Figure 21:
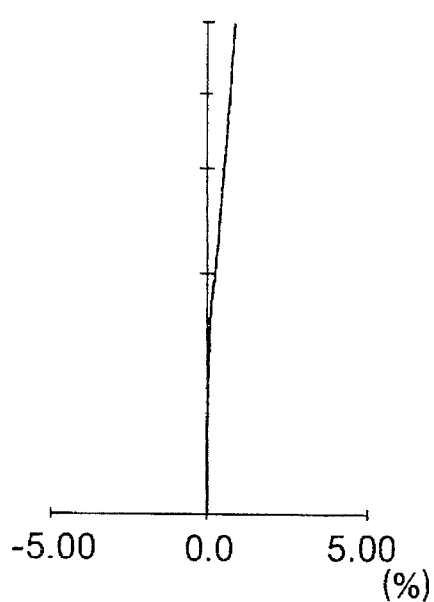
Figure 21:
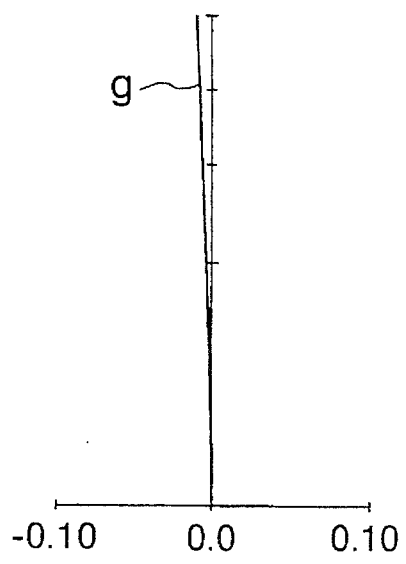
Figure 22:
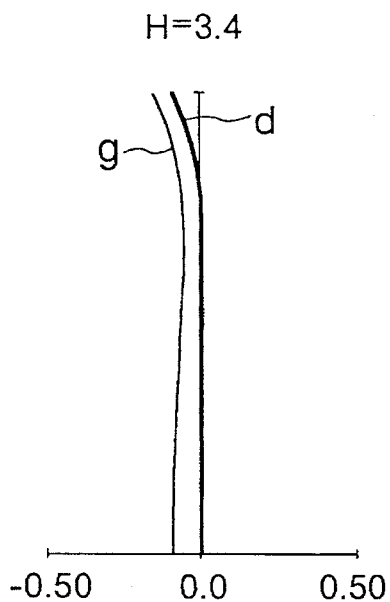
FIG. 22 shows graphs of various aberrations at the wide-angle end according to the fifth embodiment of the present invention.
Figure 22:
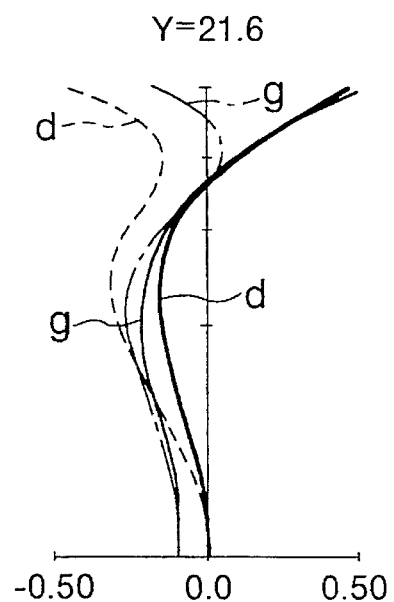
Figure 22:
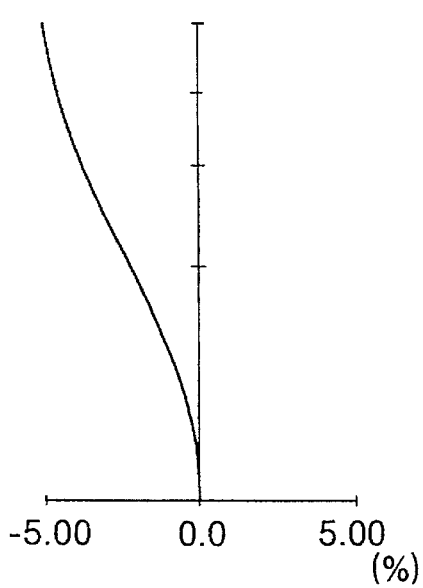
Figure 22:
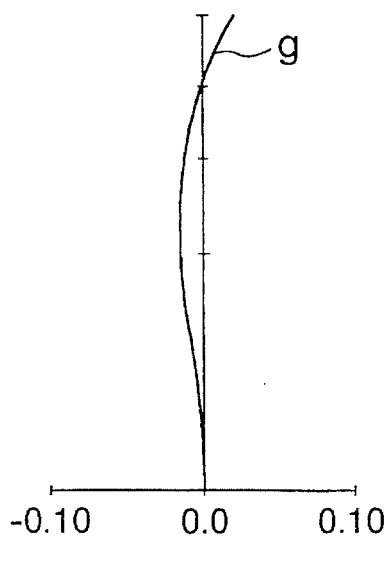
Figure 23:
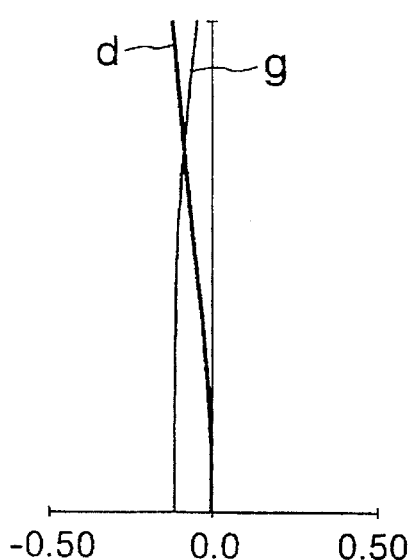
FIG. 23 shows graphs of various aberrations in an intermediate focal length state according to the fifth embodiment of the present invention.
Figure 23:
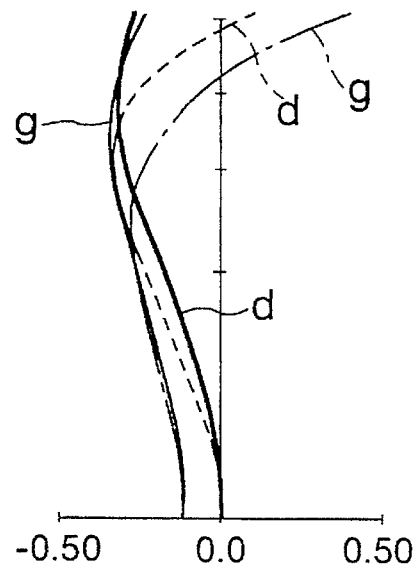
Figure 23:
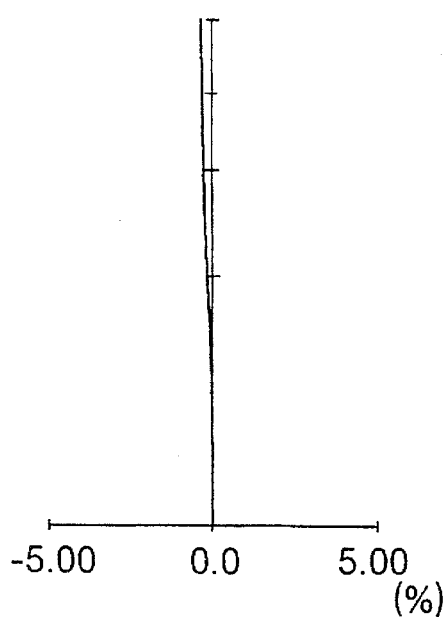
Figure 23:
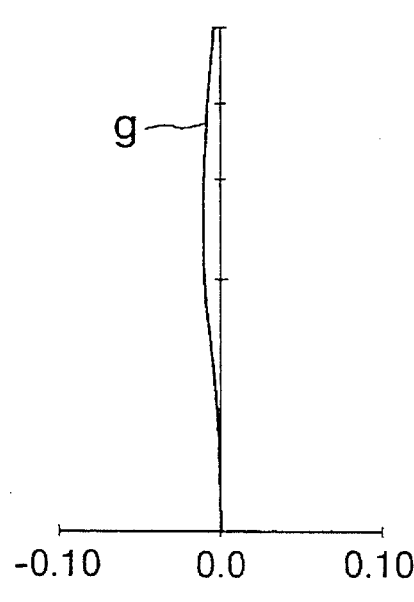
Figure 24:
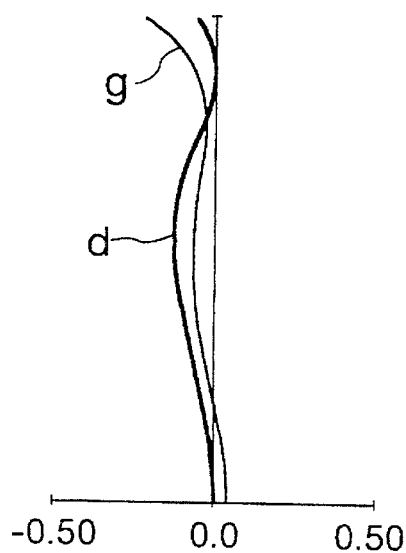
FIG. 24 shows graphs of various aberrations at the telephoto end according to the fifth embodiment of the present invention.
Figure 24:
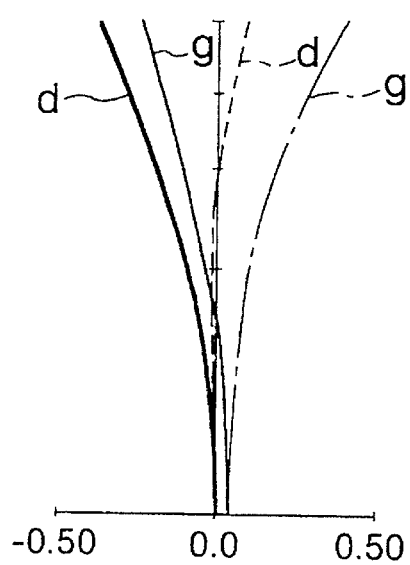
Figure 24:
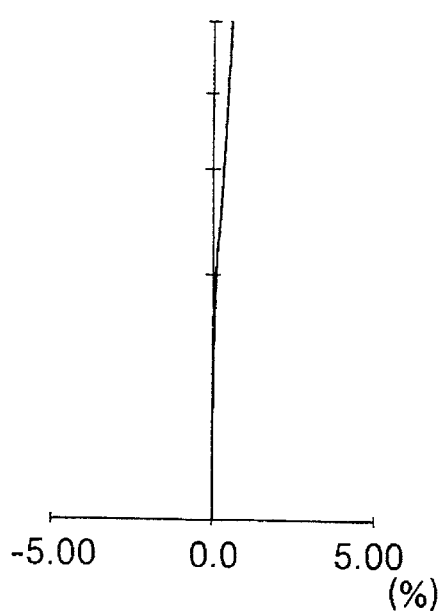
Figure 24:
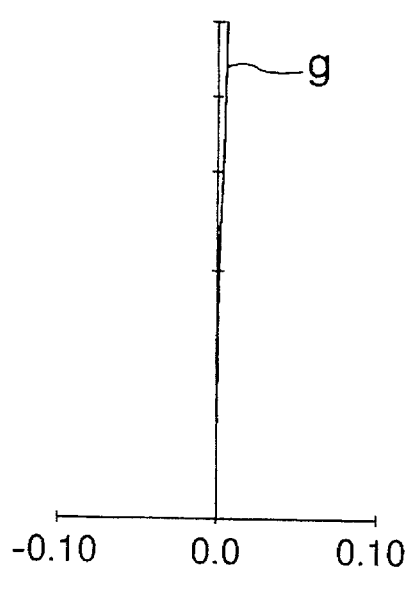
Figure 25:
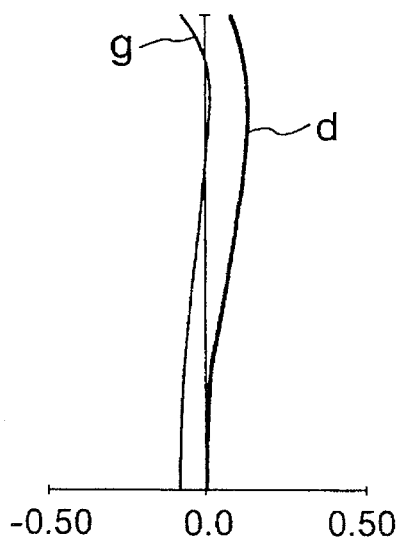
FIG. 25 shows graphs of various aberrations at the wide-angle end according to the sixth embodiment of the present invention.
Figure 25:
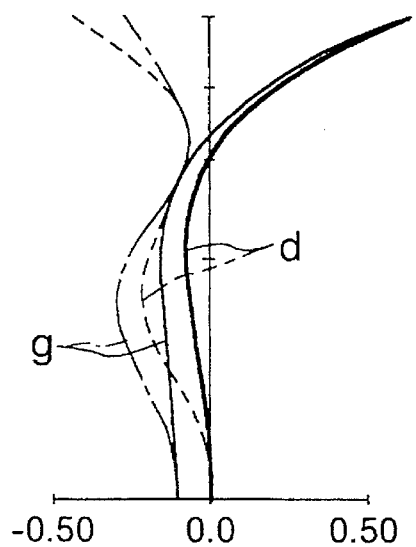
Figure 25:
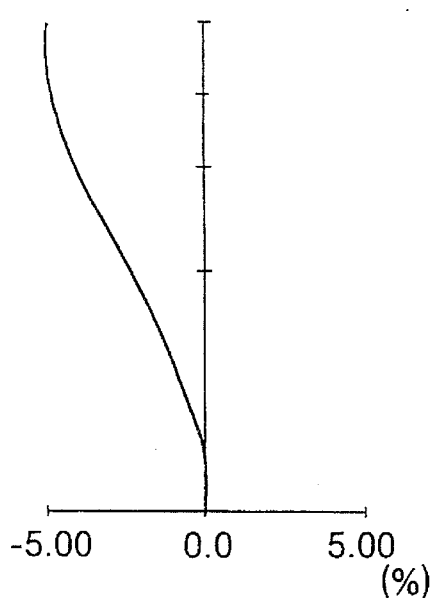
Figure 25:
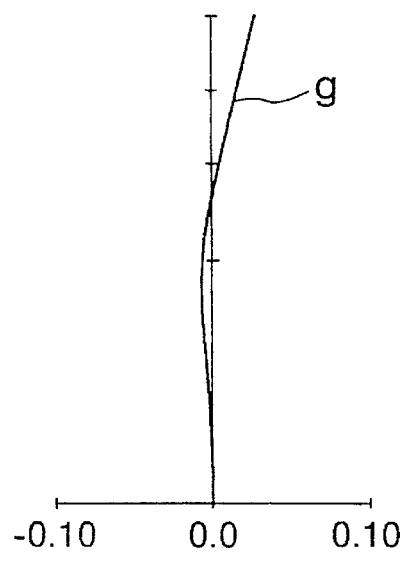
Figure 26:
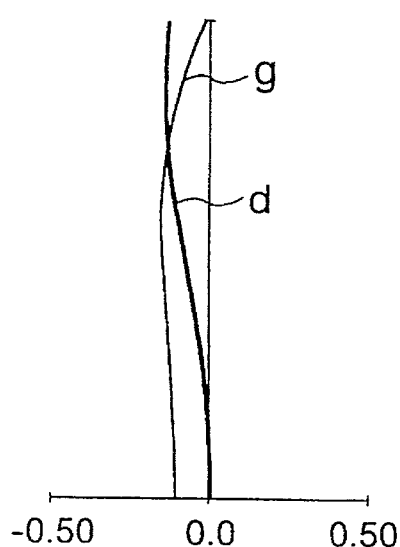
FIG. 26 shows graphs of various aberrations in an intermediate focal length state according to the sixth embodiment of the present invention.
Figure 26:
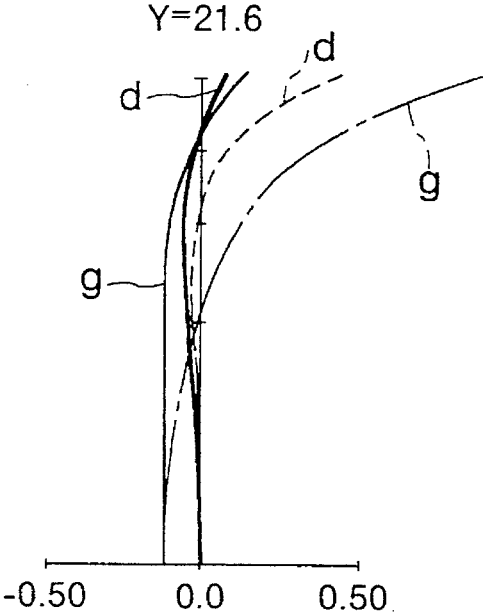
Figure 26:
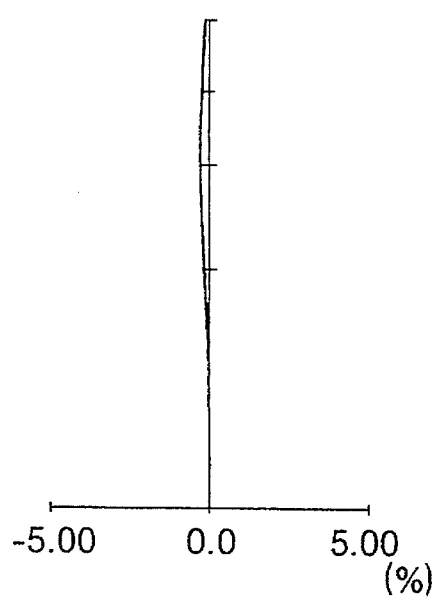
Figure 26:
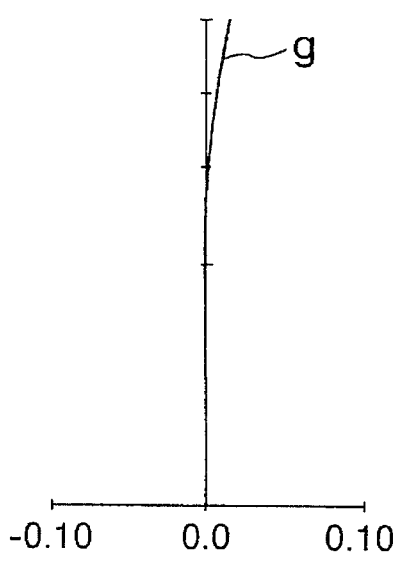
Figure 27:
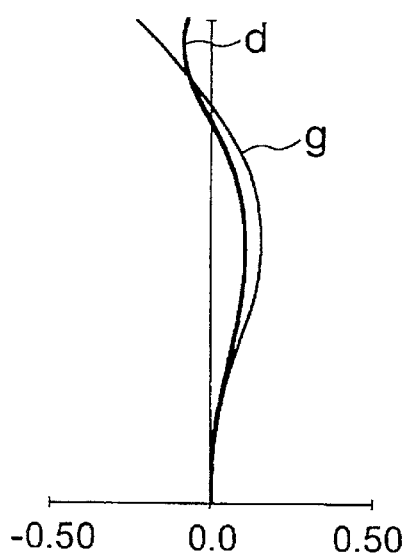
FIG. 27 shows graphs of various aberrations at the telephoto end according to the sixth embodiment of the present invention.
Figure 27:
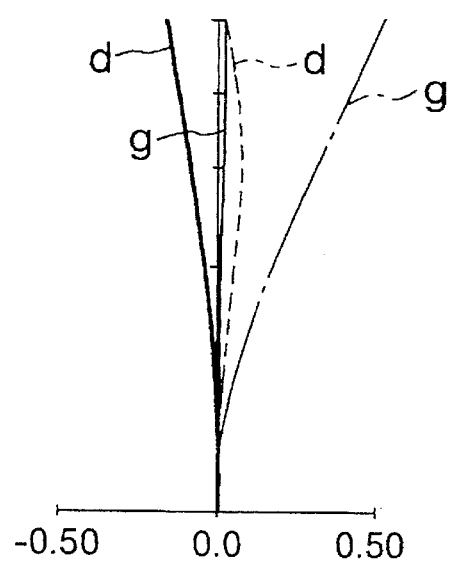
Figure 27:
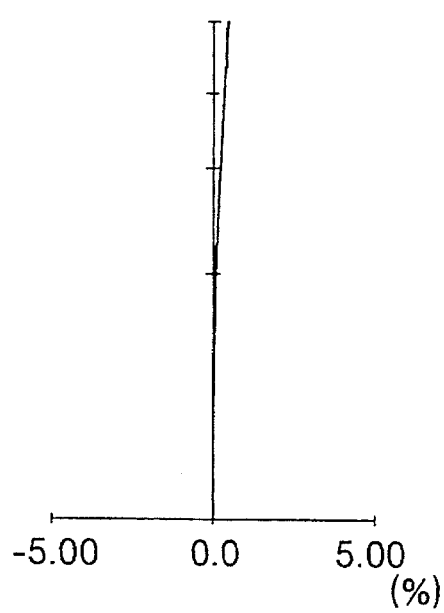
Figure 27:
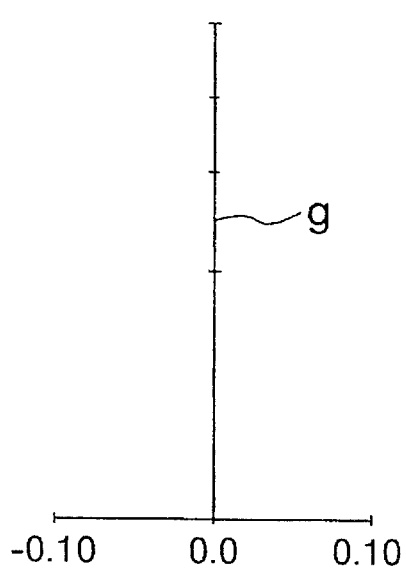
Figure 28:
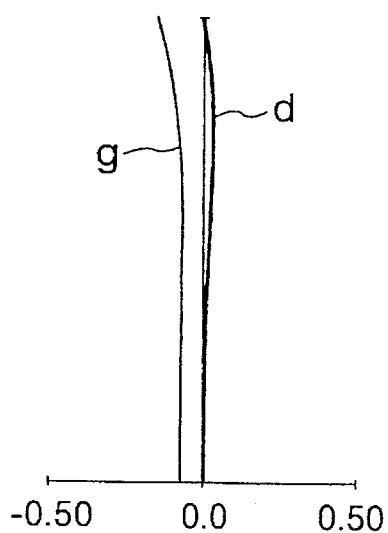
FIG. 28 shows graphs of various aberrations at the wide-angle end according to the seventh embodiment of the present invention.
Figure 28:
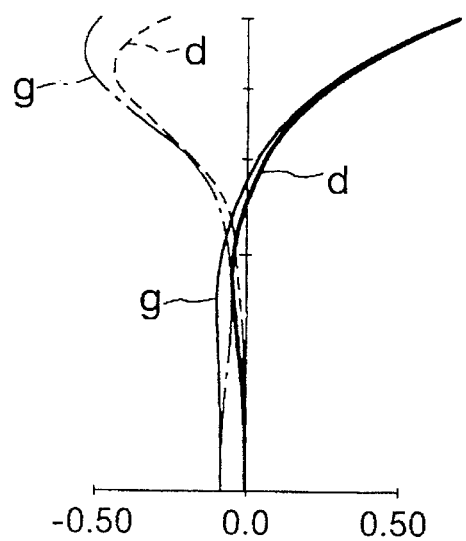
Figure 28:
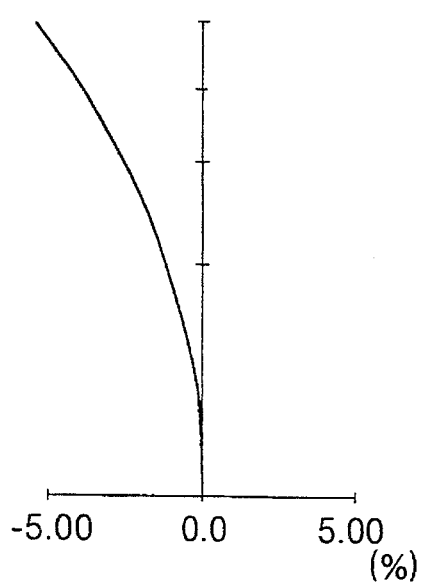
Figure 28:
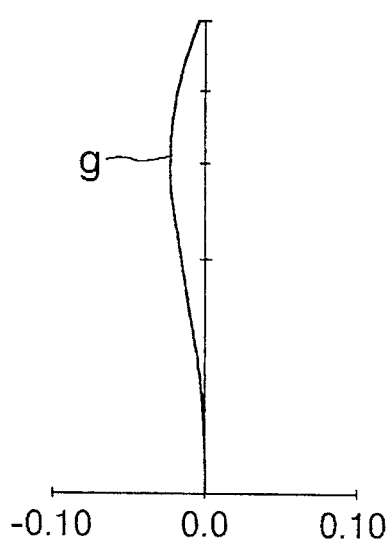
Figure 29:
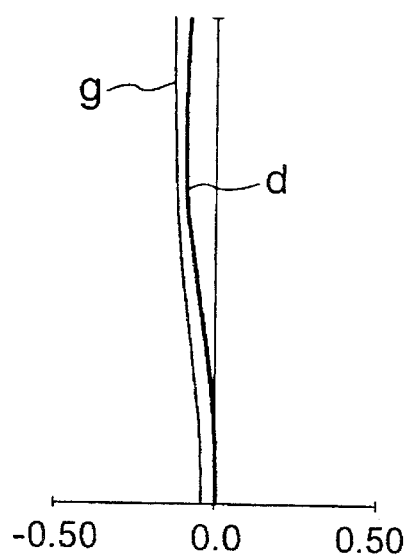
FIG. 29 shows graphs of various aberrations in an intermediate focal length state according to the seventh embodiment of the present invention.
Figure 29:
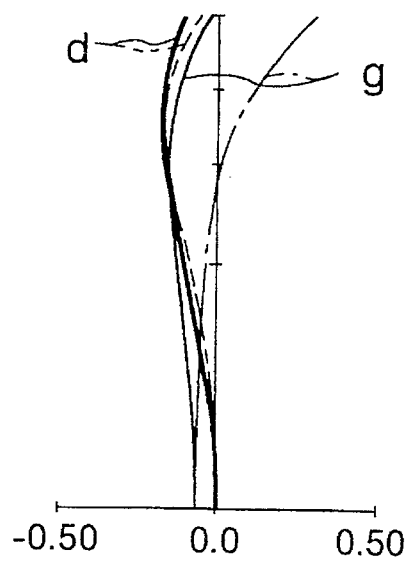
Figure 29:
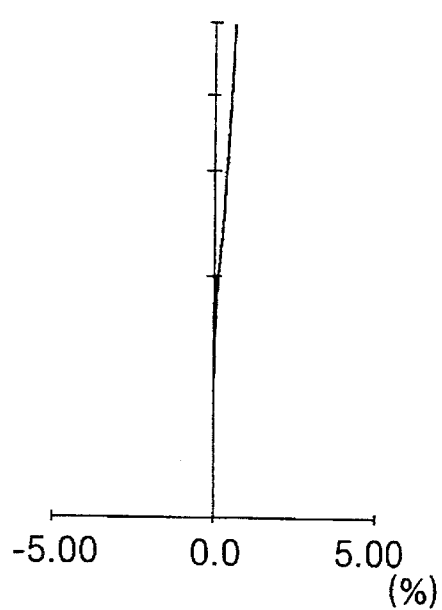
Figure 29:
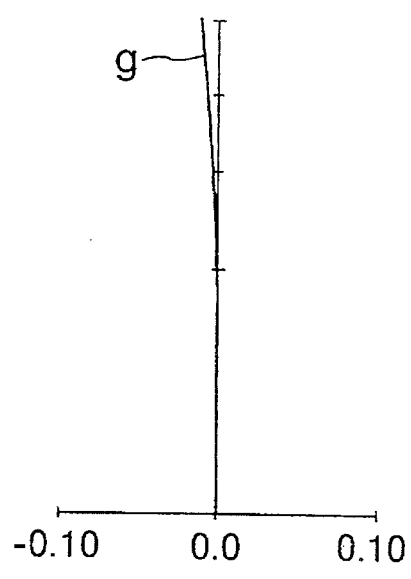
Figure 30:
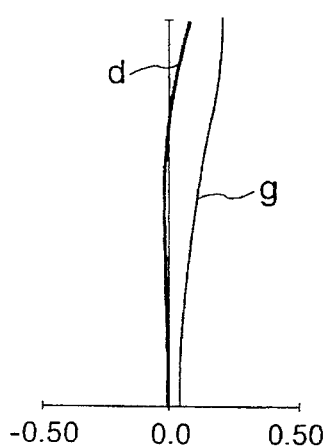
FIG. 30 shows graphs of various aberrations at the telephoto end according to the seventh embodiment of the present invention.
Figure 30:
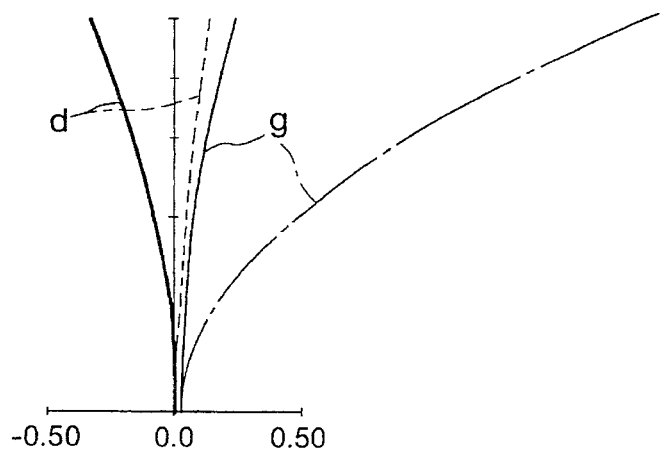
Figure 30:
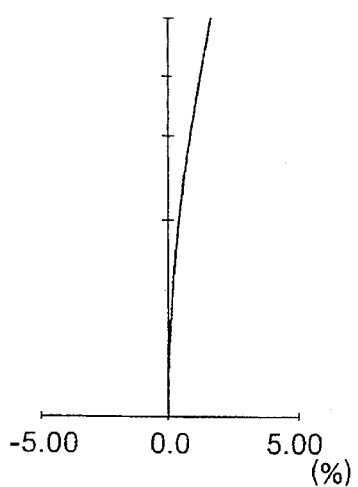
Figure 30:
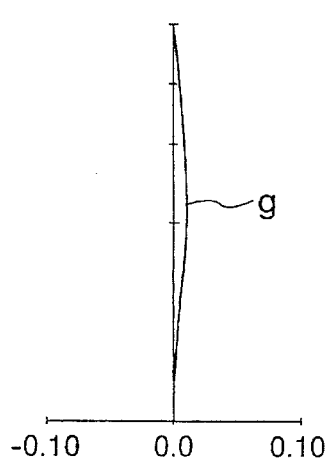
Figure 31:
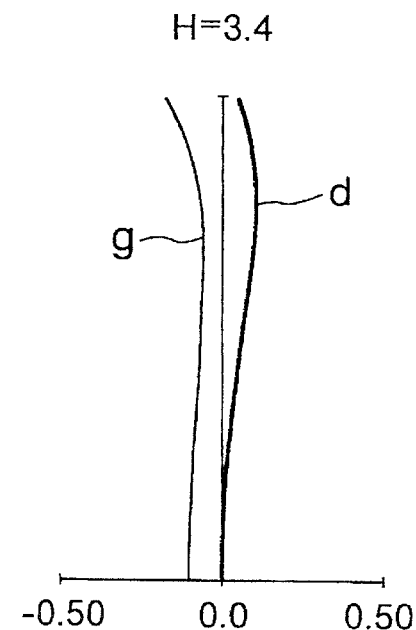
FIG. 31 shows graphs of various aberrations at the wide-angle end according to the eighth embodiment of the present invention.
Figure 31:
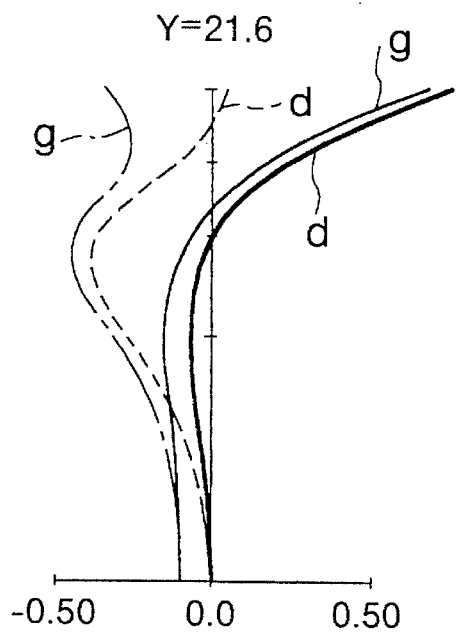
Figure 31:
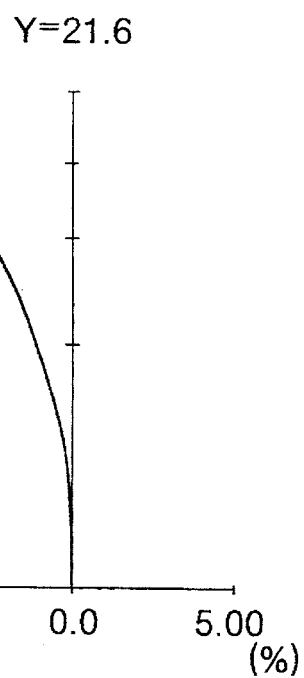
Figure 31:
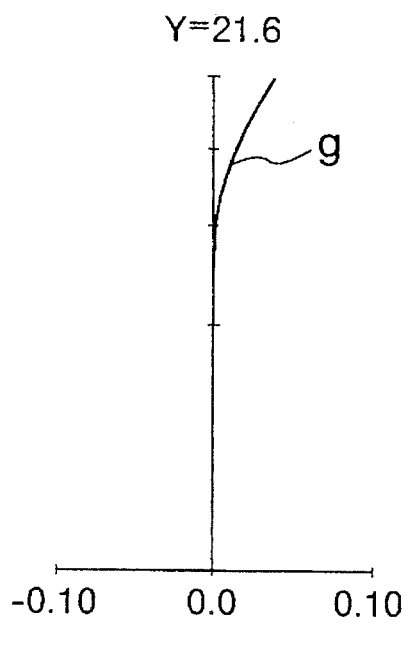
Figure 32:
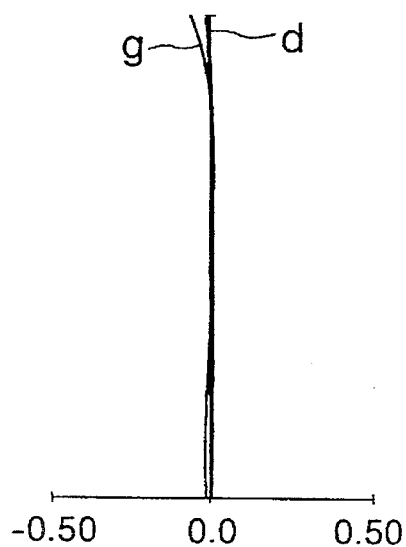
FIG. 32 shows graphs of various aberrations in an intermediate focal length state according to the eighth embodiment of the present invention.
Figure 32:
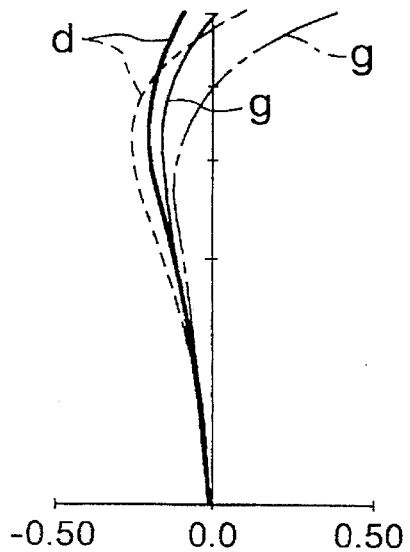
Figure 32:
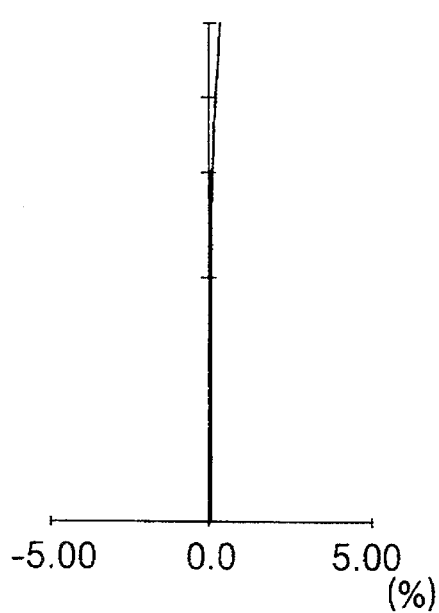
Figure 32:
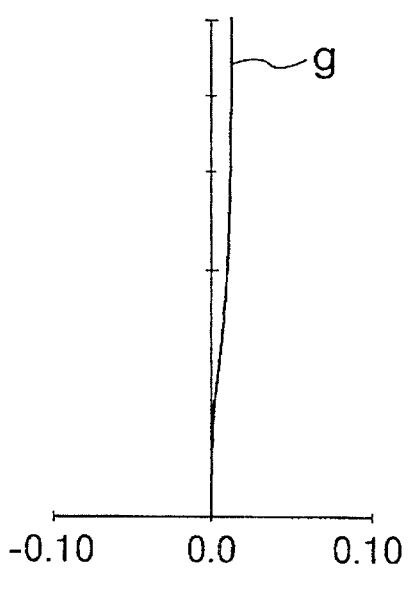
Figure 33:
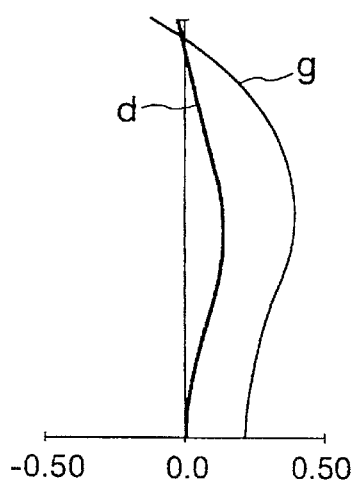
FIG. 33 shows graphs of various aberrations at the telephoto end according to the eighth embodiment of the present invention.
Figure 33:
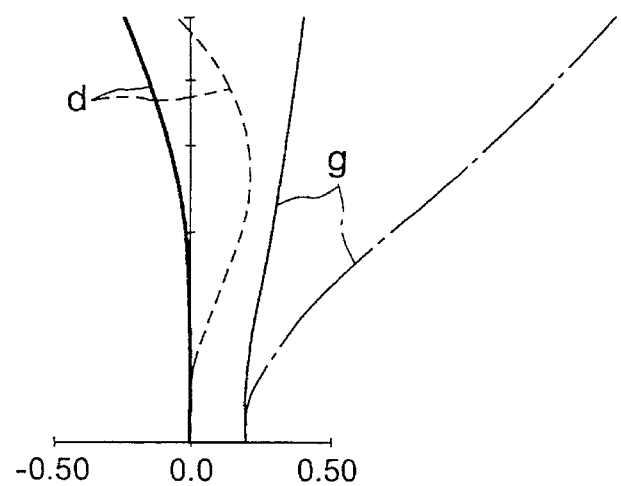
Figure 33:
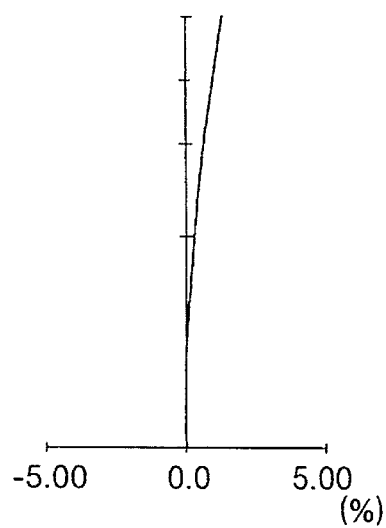
Figure 33:
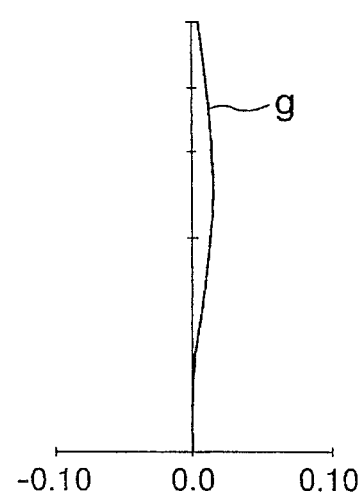
Figure 34:
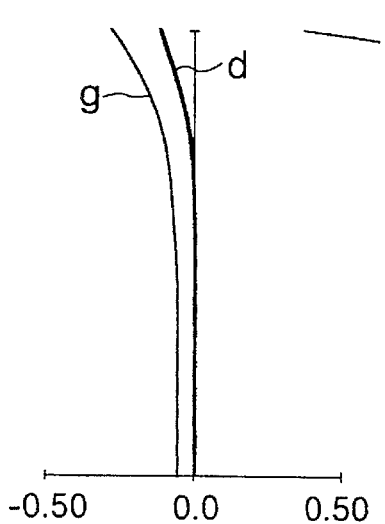
FIG. 34 shows graphs of various aberrations at the wide-angle end according to the ninth embodiment of the present invention.
Figure 34:
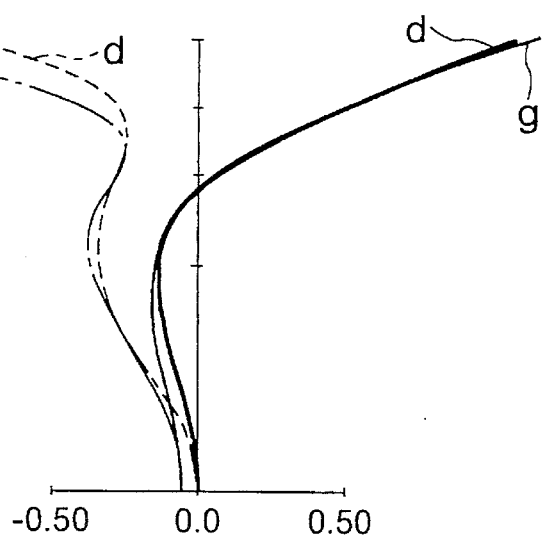
Figure 34:
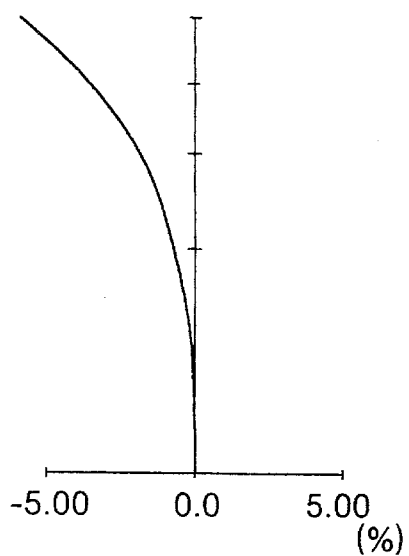
Figure 34:
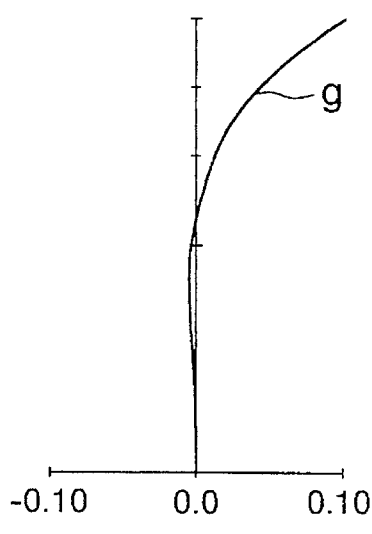
Figure 35:
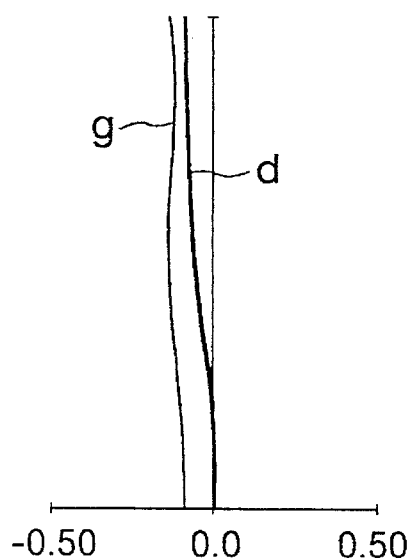
FIG. 35 shows graphs of various aberrations in an intermediate focal length state according to the ninth embodiment of the present invention.
Figure 35:
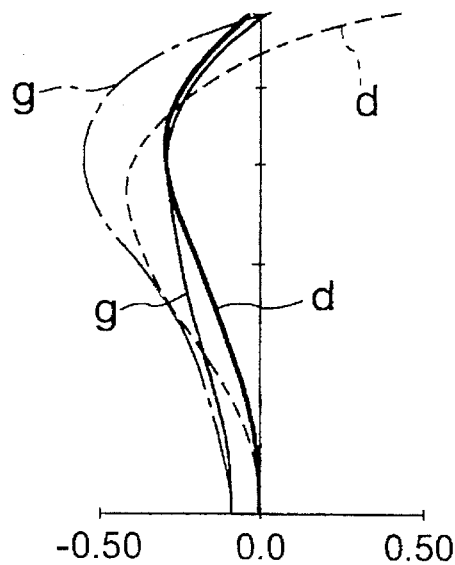
Figure 35:
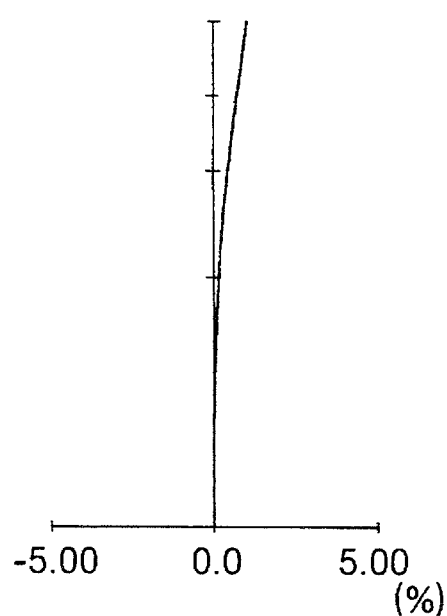
Figure 35:
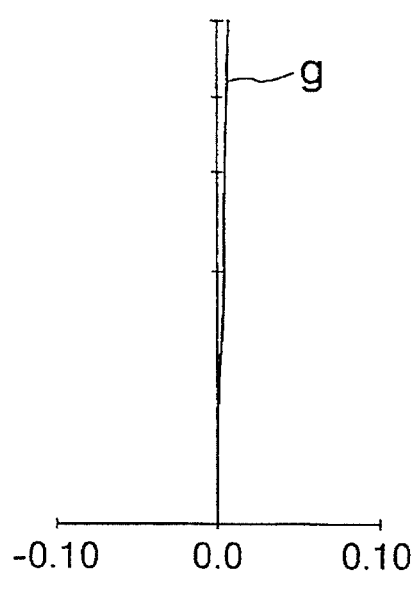
Figure 36:
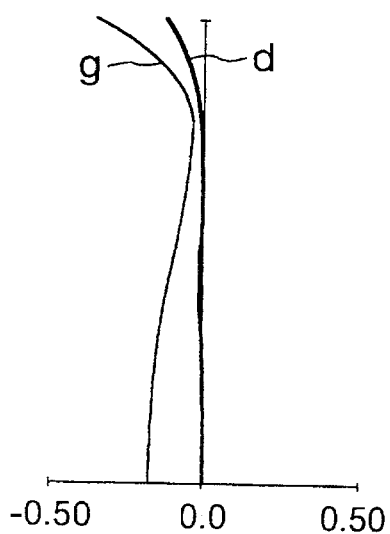
FIG. 36 shows graphs of various aberrations at the telephoto end according to the ninth embodiment of the present invention.
Figure 36:
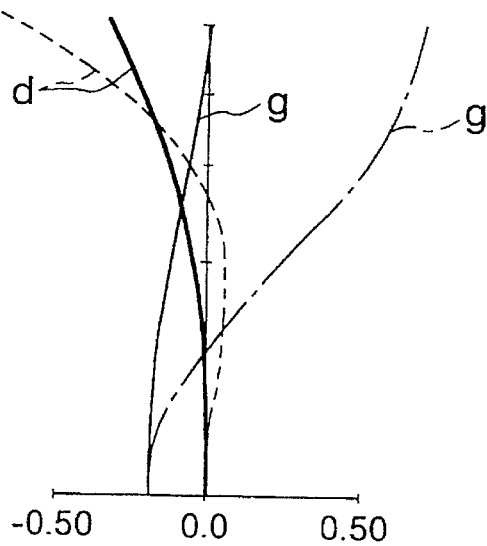
Figure 36:
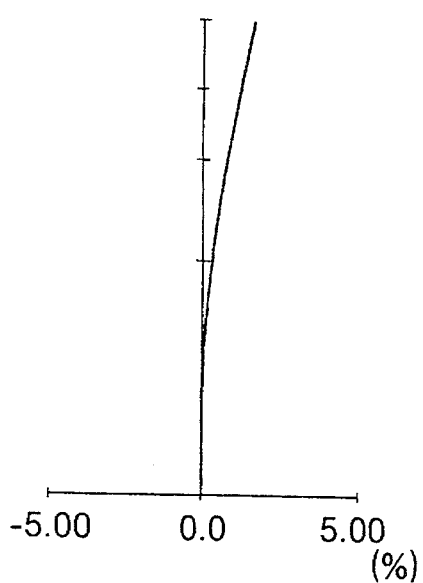
Figure 36:
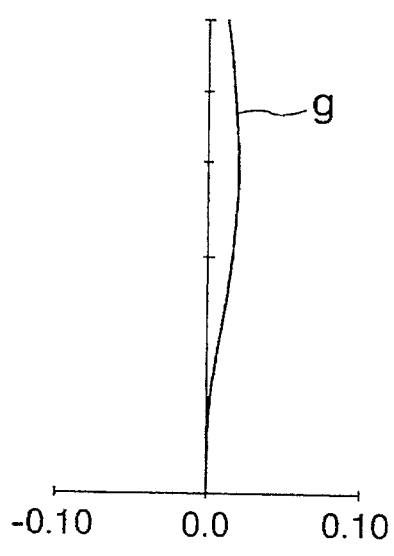

In the ninth embodiment, as shown in FIG. 9, a negative first lens unit G1 includes, in the following order from the object side, a biconcave negative lens having an aspherical surface on its image side, and a cemented lens of a biconvex positive lens and a biconcave negative lens. A positive second lens unit G2 includes, in the following order from the object side, a cemented lens of a negative meniscus lens having a convex surface facing the object side and a biconvex positive lens, a cemented lens of a biconvex positive lens and a negative meniscus lens having a concave surface facing the object side, and a biconvex positive lens. A negative third lens unit G3 includes, in the following order from the object side, a cemented lens of a positive meniscus lens having a concave surface facing the object side and a biconcave negative lens, and a biconcave negative lens. A positive fourth lens unit G4 includes, in the following order from the object side, a biconvex positive lens having an aspherical surface on its object side, and a negative meniscus lens having a concave surface facing the object side. A stop S is located between the second and third lens units G2 and G3, and moves integrally with the third lens unit G3 upon zooming.

The data values and the condition corresponding values of the ninth embodiment will be summarized below.

TABLE 9

Data Values of Ninth Embodiment
$f = 24.70$ to $116.99$
$F = 3.53$ to $5.69$
$85.9$ to $20.6°$

|  | r | d | ν | n |
|---|---|---|---|---|
| 1 | −102.5666 | 2.0000 | 45.01 | 1.74400 |
| 2* | 27.7615 | 2.7000 |  |  |
| 3 | 47.1181 | 9.2000 | 25.46 | 1.80518 |
| 4 | −127.4792 | 2.0000 | 60.35 | 1.62041 |
| 5 | 41.1160 | D5 |  |  |
| 6 | 43.0100 | 1.3000 | 25.46 | 1.80518 |
| 7 | 27.5706 | 6.0000 | 70.24 | 1.48749 |
| 8 | −125.6222 | 0.1000 |  |  |
| 9 | 48.6040 | 7.0000 | 70.24 | 1.48749 |
| 10 | −34.6797 | 1.3000 | 36.54 | 1.83060 |
| 11 | −104.3509 | 0.1000 |  |  |
| 12 | 41.6905 | 5.0000 | 60.35 | 1.62041 |
| 13 | −378.6553 | D13 |  |  |
| 14 | (stop) | 1.5000 |  |  |
| 15 | −310.6938 | 3.5000 | 27.64 | 1.75520 |
| 16 | −25.7149 | 1.1000 | 54.62 | 1.51454 |
| 17 | 43.2109 | 1.8000 |  |  |
| 18 | −44.4130 | 1.1000 | 45.06 | 1.74400 |
| 19 | 222.7680 | D19 |  |  |
| 20* | 76.1804 | 7.0000 | 70.45 | 1.48749 |
| 21 | −22.9066 | 1.0000 |  |  |
| 22 | −20.1997 | 1.5000 | 25.36 | 1.80518 |
| 23 | −28.6184 | Bf |  |  |

Second Surface Aspherical Surface Coefficients $k = 1.000$
$C6 = -0.6607 \times 10^{-8}$
$C10 = -0.1739 \times 10^{-13}$
$C4 = -0.1073 \times 10^{-4}$
$C8 = 0.8487 \times 10^{-11}$ 20th Surface Aspherical Surface Coefficients $k = 1.000$
$C6 = -0.2058 \times 10^{-7}$
$C10 = -0.2184 \times 10^{-12}$
$C4 = -0.9966 \times 10^{-5}$
$C8 = 0.1242 \times 10^{-9}$ Change in Interval Upon Zooming

| f | 24.6997 | 48.9995 | 116.9947 |
|---|---|---|---|
| D5 | 47.8052 | 16.5638 | 1.0000 |
| D13 | 1.0000 | 9.0924 | 27.4128 |
| D19 | 20.9948 | 11.0192 | 1.0000 |
| Bf | 38.0994 | 56.5808 | 95.4826 |

Condition Corresponding Values (7) f1/fT = −0.269
(8) f3/fW = −1.604
(9) f4/fW = 2.494

TABLE 9-continued

(10) f3/f1 = 1.260
(11) B2T/B2W = 4.172
(12) f1 − 3W/fW = 3.001
(13) f1 − 3T/f1 = 6.221
(14) T4/fT = 0.081
(15) nN − nP = 0.31769
(16) νP − νN = 45.09
(17) (nF − nR) · A(Y/3) = 0.0141
(18) A(Y/3)/A(Y/4) = 3.239

FIGS. 10, 13, 16, 19, 22, 25, 28, 31, and 34 respectively show graphs of various aberrations at the wide-angle end of the first to ninth embodiments, FIGS. 11, 14, 17, 20, 23, 26, 29, 32, and 35 respectively show graphs of various aberrations in an intermediate focal length state of the first to ninth embodiments, and FIGS. 12, 15, 18, 21, 24, 27, 30, 33, and 36 respectively show graphs of various aberrations at the telephoto end of the first to ninth embodiments. In each of these graphs, H is the incident light height, Y is the image height, d is the d-line ($\lambda$=587.6 nm), and g is the g-line ($\lambda$=435.8 nm). In each graph showing astigmatism, a dotted curve represents the meridional image surface, and a solid curve represents the sagittal image surface.

As can be seen from these graphs, in each of the above embodiments, various aberrations are satisfactorily corrected, and good imaging performance can be obtained.

As described above, according to the present invention, a compact zoom lens which has a field angle, at the wide-angle end, of 80° or more, a zoom ratio of ×4 or more, and good imaging performance, can be provided.

An image can be deflected by moving one of the first to fourth lens units or a portion of one of these lens units in a direction perpendicular to the optical axis, and hence, the present invention can be applied to an image stabilizing optical system. Focusing is preferably attained by moving the first lens unit. Alternatively, focusing may be attained by moving the third or fourth lens unit.

What is claimed is:

1. A zoom lens with a high zoom ratio, which comprises, in the following order from an object side, a first lens unit having a negative refractive power, a second lens unit having a positive refractive power, a third lens unit having a negative refractive power, and a fourth lens unit having a positive refractive power, and attains zooming from a wide-angle end to a telephoto end by reducing an air gap between said first and second lens units, extending an air gap between said second and third lens units, and reducing an air gap between said third and fourth lens units, wherein said zoom lens satisfies the following conditions:

$-0.45 < f1/fT < -0.15$ $0.2 < f4/fT < 0.35$ $-4.0 < B2T < -1.6$ where fT is the focal length of said zoom lens at the telephoto end, f1 is the focal length of said first lens unit, f4 is the focal length of said fourth lens unit, and B2T is the imaging magnification of said second lens unit at the telephoto end.

2. A zoom lens according to claim 1, wherein said zoom lens further satisfies the following condition:

$-0.30 < f3/fT < -0.15$ where f3 is the focal length of said third lens unit.

3. A zoom lens according to claim 1, wherein said zoom lens satisfies the following condition:

$2.8 < B2T/B2W < 6.0$ where B2W is the imaging magnification of said second lens unit at the wide-angle end of said zoom lens.

4. A zoom lens according to claim 1, wherein said zoom lens satisfies the following condition:

$-3.0 < \Delta e2/\Delta e3 < -0.9$ where $\Delta e2$ is the difference between intervals between said second and third lens units at the telephoto end and the wide-angle end of said zoom lens, and $\Delta e3$ is the difference between intervals between said third and fourth lens units at the telephoto end and the wide-angle end of said zoom lens.

5. A zoom lens according to claim 1, wherein said first lens unit includes at least one aspherical surface.

6. A zoom lens according to claim 1, wherein said fourth lens unit includes at least one aspherical surface.

7. A zoom lens according to claim 4, wherein said zoom lens satisfies the following condition:

$-3.0 < \Delta e2/\Delta e3 < -1.2$.

8. A zoom lens with a zoom ratio of at least ×4 and a field angle of at least 80°, which comprises, in the following order from an object side, a first lens unit having a negative refractive power, a second lens unit having a positive refractive power, a third lens unit having a negative refractive power, and a fourth lens unit having a positive refractive power, and attains zooming from a wide-angle end to a telephoto end by reducing an air gap between said first and second lens units, extending an air gap between said second and third lens units, and reducing an air gap between said third and fourth lens units, wherein said zoom lens satisfies the following conditions:

$-0.45 < f1/fT < -0.20$ $-3.0 < f3/fW < -1.2$ $2.0 < f4/fW < 6.0$ where fW is the focal length of said zoom lens at the wide-angle end, fT is the focal length of said zoom lens at the telephoto end, f1 is the focal length of said first lens unit, f3 is the focal length of said third lens unit, and f4 is the focal length of said fourth lens unit.

9. A zoom lens according to claim 8, wherein said zoom lens further satisfies the following condition:

$0.7 < f3/f1 < 2.0$.

10. A zoom lens according to claim 8, wherein said zoom lens satisfies the following condition:

$2.8 < B2T/B2W < 5.0$ where B2W and B2T are respectively the imaging magnifications of said second lens unit at the wide-angle end and the telephoto end of said zoom lens.

11. A zoom lens according to claim 8, wherein said zoom lens satisfies the following condition:

$0.5 < f1-3W/fW < 5$ where f1-3W is the synthesized focal length of said first, second, and third lens units at the wide-angle end of said zoom lens.

12. A zoom lens according to claim 8, wherein said zoom lens satisfies the following condition:

$$1<f1\text{-}3T/f1$$

where f1-3T is the synthesized focal length of said first, second, and third lens units at the telephoto end of said zoom lens.

13. A zoom lens according to claim 8, wherein said zoom lens satisfies the following condition:

$$0.03<T4/fT<0.10$$

where T4 is the on-axis thickness from a lens surface closest to the object side to a lens surface closest to the image side in said fourth lens unit.

14. A zoom lens according to claim 8, wherein said fourth lens unit consists of a single negative lens and a single positive lens.

15. A zoom lens according to claim 14, wherein said fourth lens unit consists of a cemented lens of the single negative lens and the single positive lens.

16. A zoom lens according to claim 14, wherein said zoom lens satisfies the following condition:

$$nN-nP>0$$

where nN and nP are respectively the refractive indices of the negative and positive lenses constituting said fourth lens unit.

17. A zoom lens according to claim 14, wherein said zoom lens satisfies the following condition:

$$vP-vN>10$$

where vN and vP are respectively the Abbe's numbers of the negative and positive lenses constituting said fourth lens unit.

18. A zoom lens according to claim 14, wherein said fourth lens unit includes at least one aspherical surface.

19. A zoom lens according to claim 18, wherein a shape of the aspherical surface in said fourth lens unit satisfies the following conditions:

$$(nF-nR)\cdot A(Y/3)>0$$

$$A(Y/3)/A(Y/4)>2$$

where Y is the maximum image height, nF is the refractive index, on the object side, of the aspherical surface, and nR is the refractive index, on the image side, of the aspherical surface, an aspherical surface amount A(h) being defined by the following formula:

$$A(h)=X(h)-(h^2/r)/[1+(1-h^2/r^2)^{1/2}]$$

where h is the height from the optical axis, X(h) is the distance from the tangent plane of the vertex of the aspherical surface to the aspherical surface at the height h along the optical axis direction, and r is the paraxial radius of curvature of the aspherical surface.

20. A zoom lens according to claim 8, wherein said first lens unit includes at least one aspherical surface.

21. A zoom lens with a high zoom ratio, which comprises, in the following order from an object side, a first lens unit having a negative refractive power, a second lens unit having a positive refractive power, a third lens unit having a negative refractive power, and a fourth lens unit having a positive refractive power, and attains zooming from a wide-angle end to a telephoto end by reducing an air gap between said first and second lens units, extending an air gap between said second and third lens units, and reducing an air gap between said third and fourth lens units, wherein said zoom lens satisfies the following conditions:

$$2<f4/fW<6$$

$$0.03<T4/fT<0.10$$

$$1<f1\text{-}3T/f1$$

where fW is the focal length of said zoom lens at the wide-angle end, fT is the focal length of said zoom lens at the telephoto end, f1 is the focal length of said first lens unit, f4 is the focal length of said fourth lens unit, f1-3T is the synthesized focal length of said first, second, and third lens units at the telephoto end of said zoom lens, and T4 is the on-axis thickness from a lens surface closest to the object side to a lens surface closest to the image side in said fourth lens unit.

22. A zoom lens according to claim 21, wherein said fourth lens unit consists of a single negative lens and a single positive lens.

23. A zoom lens according to claim 22, wherein said fourth lens unit consists of a cemented lens of the single negative lens and the single positive lens.

24. A zoom lens according to claim 22, wherein said zoom lens satisfies the following condition:

$$nN-nP>0$$

where nN and nP are respectively the refractive indices of the negative and positive lenses constituting said fourth lens unit.

25. A zoom lens according to claim 22, wherein said zoom lens satisfies the following condition:

$$vP-vN>10$$

where vN and vP are respectively the Abbe's numbers of the negative and positive lenses constituting said fourth lens unit.

26. A zoom lens according to claim 21, wherein said fourth lens unit includes at least one aspherical surface.

27. A zoom lens according to claim 26, wherein a shape of the aspherical surface in said fourth lens unit satisfies the following conditions:

$$(nF-nR)\cdot A(Y/3)>0$$

$$A(Y/3)/A(Y/4)>2$$

where Y is the maximum image height, nF is the refractive index, on the object side, of the aspherical surface, and nR is the refractive index, on the image side, of the aspherical surface, an aspherical surface amount A(h) being defined by the following formula:

$$A(h)=X(h)-(h^2/r)/[1+(1-h^2/r^2)^{1/2}]$$

where h is the height from the optical axis, X(h) is the distance from the tangent plane of the vertex of the aspherical surface to the aspherical surface at the height h along the optical axis direction, and r is the paraxial radius of curvature of the aspherical surface.

28. A zoom lens according to claim 21, wherein said first lens unit includes at least one aspherical surface.

* * * * *